(12) United States Patent
Duluk, Jr. et al.

(10) Patent No.: US 6,577,317 B1
(45) Date of Patent: Jun. 10, 2003

(54) APPARATUS AND METHOD FOR GEOMETRY OPERATIONS IN A 3D-GRAPHICS PIPELINE

(75) Inventors: Jerome F. Duluk, Jr., Palo Alto, CA (US); Jack Benkual, Cupertino, CA (US); Vaughn T. Arnold, Scott's Valley, CA (US); Tuan D. Nguyen, San Jose, CA (US); Richard E. Hessel, Pleasanton, CA (US); Stephen L. Dodgen, Boulder Creek, CA (US); Shun Wai Go, Milpitas, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/379,144

(22) Filed: Aug. 20, 1999

(65) Prior Publication Data (65)

Related U.S. Application Data

(63) Continuation of application No. 09/213,990, filed on Dec. 17, 1999.
(60) Provisional application No. 60/097,336, filed on Aug. 20, 1998.

(51) Int. Cl.$^7$ .................................................. G06T 1/20
(52) U.S. Cl. ....................... 345/506; 345/502; 345/505; 345/419
(58) Field of Search ................................ 345/506, 505, 345/501, 502, 503, 504, 418, 419, 561

(56) References Cited

U.S. PATENT DOCUMENTS

| 4,484,346 A | * 11/1984 | Sternberg et al. ............ 382/303 |
| 4,945,500 A | 7/1990 | Deering ........................ 364/522 |
| 4,970,636 A | 11/1990 | Snodgrass et al. .......... 364/518 |
| 5,083,287 A | 1/1992 | Obata et al. ................. 395/126 |
| 5,123,085 A | 6/1992 | Wells et al. |
| 5,402,532 A | 3/1995 | Epstein et al. ............... 395/122 |
| 5,481,669 A | 1/1996 | Poulton et al. |
| 5,574,836 A | 11/1996 | Broemmelsiek ............. 395/127 |
| 5,579,455 A | 11/1996 | Greene et al. |
| 5,596,686 A | 1/1997 | Dulukm, Jr. |
| 5,684,939 A | 11/1997 | Foran et al. ................. 395/131 |
| 5,699,497 A | 12/1997 | Erdahl et al. |
| 5,710,876 A | 1/1998 | Peercy et al. ................ 395/126 |
| 5,767,589 A | 6/1998 | Lake et al. |
| 5,767,859 A | 6/1998 | Rossin et al. ................ 345/434 |

(List continued on next page.)

OTHER PUBLICATIONS

Angel (interactive computer graphics: a top–down approach with OpenGl: ISBN: 0–201–85571–2—sections 6.8 & 7.7.2).

Schilling et al., "Texram: a smart memory for texturing," IEEE computer graphics and applications, 5/96, 32–41.

(List continued on next page.)

*Primary Examiner*—Matthew C. Bella
*Assistant Examiner*—Mackly Monestime
(74) *Attorney, Agent, or Firm*—Dorsey & Whitney LLP; R. Michael Ananian

(57) ABSTRACT

An apparatus and methods for rendering 3D-graphics images preferably includes a port for receiving commands from a graphics application, an output for sending a rendered image to a display and a geometry-operations pipeline, coupled to the port and to the output, the geometry-operations pipeline including a block for performing transformations. In one embodiment, the block for performing transformations includes a co-extensive logical and first physical stages, as well as a second physical stage including multiple logical stages. The second physical stage includes multiple logical stages that interleave their execution.

11 Claims, 18 Drawing Sheets

U.S. PATENT DOCUMENTS

| | | | |
|---|---|---|---|
| 5,798,770 A | * 8/1998 | Baldwin | 345/506 |
| 5,828,378 A | 10/1998 | Shiraishi | 345/422 |
| 5,841,447 A | 11/1998 | Drews | |
| 5,854,631 A | 12/1998 | Akeley et al. | 345/419 |
| 5,864,342 A | 1/1999 | Kajiya et al. | 345/418 |
| RE36,145 E | 3/1999 | DeAguiar et al. | 345/511 |
| 5,880,736 A | 3/1999 | Peercy et al. | 345/426 |
| 5,889,997 A | * 3/1999 | Strunk | 395/706 |
| 5,920,326 A | 7/1999 | Rentschler et al. | |
| 5,936,629 A | * 8/1999 | Brown et al. | 345/426 |
| 5,949,424 A | 9/1999 | Cabral et al. | 345/426 |
| 5,949,428 A | * 9/1999 | Toelle et al. | 345/431 |
| 5,977,977 A | 11/1999 | Kajiya et al. | 345/418 |
| 5,990,904 A | 11/1999 | Griffin | |
| 6,002,410 A | 12/1999 | Battle | |
| 6,002,412 A | 12/1999 | Schinnerer | |
| 6,118,452 A | 9/2000 | Gannett | |
| 6,128,000 A | 10/2000 | Jouppi et al. | |
| 6,167,486 A | 12/2000 | Lee et al. | |
| 6,204,859 B1 | 3/2001 | Jouppi et al. | |
| 6,246,415 B1 | 6/2001 | Grossman et al. | |
| 6,259,452 B1 | 7/2001 | Coorg et al. | |
| 6,259,460 B1 | * 7/2001 | Gossett et al. | 345/552 |

OTHER PUBLICATIONS

Watt, "3D Computer Graphics" (2nd ed.), Chapter 4, Reflection and Illumination Models, p. 89–126.

Foley et al., Computer Graphics—Principles and Practice (2nd ed. 1996), Chapter 16, Illumination and Shading, pp. 721–814.

Lathrop, "The Way Computer Graphics Works" (1997) Chapter 7, Rendering (Converting A Scene to Pixels), pp. 93–150.

Peercy et al., "Efficient Bump Mapping Hardware" (Computer Graphics Proceedings, Annual Conference Series, 1997) pp. 303–306.

Peercy et al. "Efficient bump mapping hardware" (Computer Graphics Proceedings, Annual Conference Series, 1997 pp. 303–306).

Lathrop "Rendering (converting a scene to pixels)", (The Way Computer Graphics Works, Wiley Computer Publishing, 1997, John Wiley & Sons, Inc., Chapter 7, pp. 93–150).

Foley et al. "Illumination and shading" (Computer Graphics Principles and Practice (2nd edition in C, Addison–Wesley Publishing Co. 1996, Chapter 16, pp. 721–814).

Watt "Reflection and illumination models" (3D Computer Graphics, 2nd edition, Addison–Wesley, 1993, pp. 89–126).

* cited by examiner

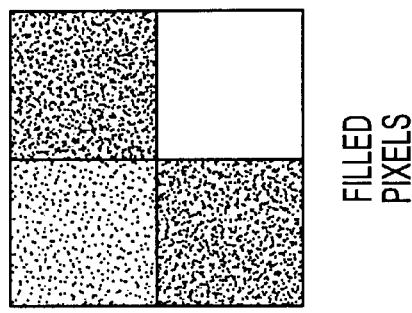
FIG. 10D FILLED PIXELS
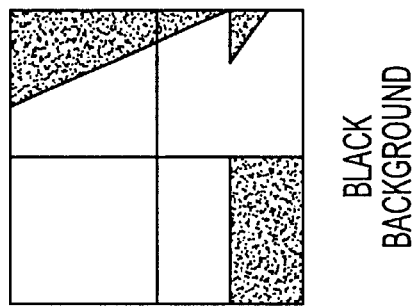
FIG. 10C BLACK BACKGROUND
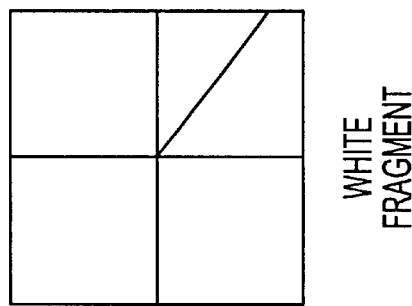
FIG. 10B WHITE FRAGMENT
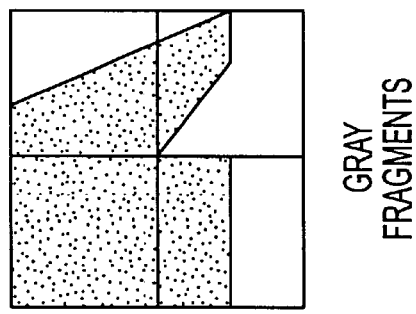
FIG. 10A GRAY FRAGMENTS

APPARATUS AND METHOD FOR GEOMETRY OPERATIONS IN A 3D-GRAPHICS PIPELINE

RELATED APPLICATIONS

This application claims the benefit under 35 USC Section 119(e) of U.S. Provisional Patent Application Serial No. 60/097,336 filed Aug. 20, 1998 and entitled GRAPHICS PROCESSOR WITH DEFERRED SHADING; which is a continuation of Ser. No. 09/213,990 filed Dec. 17, 1999 entitled HOW TO DO TANGENT SPACE LIGHTING IN A DEFERRED SHADING ARCHITECTURE; each of which is hereby incorporated by reference.

This application is also related to the following U.S. Patent Applications, each of which are incorporated herein by reference:

Ser. No. 09/213,990, filed Dec. 17, 1998, entitled HOW TO DO TANGENT SPACE LIGHTING IN A DEFERRED SHADING ARCHITECTURE;

Ser. No. 09/213,990, filed Dec. 17, 1998, entitled HOW TO DO TANGENT SPACE LIGHTING IN A DEFERRED SHADING ARCHITECTURE;

Ser. No. 09/378,598, filed Aug. 20, 1999, entitled APPARATUS AND METHOD FOR PERFORMING SETUP OPERATIONS IN A 3-D GRAPHICS PIPELINE USING UNIFIED PRIMITIVE DESCRIPTORS;

Ser. No. 09/378,633, filed Aug. 20, 1999 entitled SYSTEM, APPARATUS AND METHOD FOR SPATIALLY SORTING IMAGE DATA IN A THREE-DIMENSIONAL GRAPHICS PIPELINE;

Ser. No. 09/378,439 filed Aug. 20, 1999, entitled GRAPHICS PROCESSOR WITH PIPELINE STATE STORAGE AND RETRIEVAL;

Ser. No. 09/378,408, filed Aug. 20, 1999, entitled METHOD AND APPARATUS FOR GENERATING TEXTURE;

Ser. No.09/379,144, filed Aug. 20,1999 entitled APPARATUS AND METHOD FOR GEOMETRY OPERATIONS IN A 3D GRAPHICS PIPELINE;

Ser. No. 09/372,137, filed Aug. 20,1999 entitled APPARATUS AND METHOD FOR FRAGMENT OPERATIONS IN A 3D GRAPHICS PIPELINE;

Ser. No. 09/378,637, filed Aug. 20, 1999, entitled DEFERRED SHADING GRAPHICS PIPELINE PROCESSOR;

Ser. No. 09/377,503, filed Aug. 20, 1999, entitled DEFERRED SHADING GRAPHICS PIPELINE PROCESSOR HAVING ADVANCED FEATURES;

Ser. No. 09/378,391, filed Aug. 20, 1999, entitled METHOD AND APPARATUS FOR PERFORMING CONSERVATIVE HIDDEN SURFACE REMOVAL IN A GRAPHICS PROCESS WITH DEFERRED SHADING; and Ser. No. 09/378,299, filed Aug. 20, 1999, entitled DEFERRED SHADING GRAPHICS PIPELINE PROCESSOR, now U.S. Pat. No. 6,229,553.

FIELD OF THE INVENTION

This invention relates to high-performance 3-D graphics imaging. More particularly, the invention relates to geometry operations in a 3D-graphics pipeline, operations such as transformations, clippings, decompositions and lighting calculations.

BACKGROUND

Three-Dimensional Computer Graphics

Computer graphics is the art and science of generating pictures with a computer. Generation of pictures, or images, is commonly called rendering. Generally, in three-dimensional (3D) computer graphics, geometry that represents surfaces (or volumes) of objects in a scene is translated into pixels stored in a framebuffer and then displayed on a display device.

In a 3D animation, a sequence of still images is displayed, giving the illusion of motion in three-dimensional space. Interactive 3D computer graphics allows a user to change his viewpoint or change the geometry in real-time, thereby requiring the rendering system to create new images on the fly in real time.

In 3D computer graphics, each renderable object generally has its own local object coordinate system and, therefore, needs to be translated (or transformed) from object coordinates to pixel-display coordinates. Conceptually, this translation is a four-step process: 1) translation from object coordinates to world coordinates, the coordinate system for the entire scene, 2) translation from world coordinates to eye coordinates, based on the viewing point of the scene, 3) translation from eye coordinates to perspective-translated eye coordinates and 4) translation from perspective-translated eye coordinates to pixel (screen) coordinates. These translation steps can be compressed into one or two steps by pre-computing appropriate translation matrices before any translation occurs.

(Translation from object coordinates includes scaling for size enlargement or shrink. Perspective scaling makes farther objects appear smaller. Pixel coordinates are points in three-dimensional space in either screen precision (that is to say, pixels) or object precision (that is to say, high-precision numbers, usually floating-point).

Once the geometry is in screen coordinates, it is broken into a set of pixel-color values (that is, "rasterized") that are stored into the framebuffer.

A summary of the prior-art rendering process can be found in Watt, *Fundamentals of Three-dimensional Computer Graphics* (Addison-Wesley Publishing Company, 1989, reprinted 1991, ISBN 0-201-15442-0, herein "Watt" and incorporated by reference), particularly Chapter 5, "The Rendering Process," pages 97 to 113, and Foley et al., *Computer Graphics: Principles and Practice,* 2nd edition (Addison-Wesley Publishing Company, 1990, reprinted with corrections 1991, ISBN 0-201-12110-7, herein "Foley et al." and incorporated by reference).

FIG. 1 shows a three-dimensional object, a tetrahedron, with its own coordinate axes ($x_{object}$, $y_{object}$, $z_{object}$). The three-dimensional object is translated, scaled and placed in the viewing point's coordinate system based on ($x_{eye}$, $y_{eye}$, $z_{eye}$). The object is projected onto the viewing plane, thereby correcting for perspective. At this point, the object appears to have become two-dimensional. The object's z-coordinates, however, are preserved for later use in hidden-surface removal. The object is finally translated to screen coordinates, based on ($x_{screen}$, $y_{screen}$, $z_{screen}$), where $z_{screen}$ is going perpendicularly into the page. Points on the object now have their x and y coordinates described by pixel location (and fractions thereof) within the display screen and their z coordinates in a scaled version of distance from the viewing point.

Generic 3D-Graphics Pipeline

Many hardware renderers have been developed. See, for example, Deering et al., "Leo: A System for Cost Effective 3D Shaded Graphics," SIGGRAPH93 Proceedings, Aug.

1–6, 1993, Computer Graphics Proceedings, Annual Conference Series (ACM SIGGRAPH, 1993, Soft-cover ISBN 0-201-58889-7 and CD-ROM ISBN 0-201-56997-3, herein "Deering et al." and incorporated by reference), particularly at pages 101 to 108. Deering et al. includes a diagram of a generic 3D-graphics pipeline (that is to say, a renderer, or a rendering system) that it describes as "truly generic, as at the top level nearly every commercial 3D graphics accelerator fits this abstraction." This pipeline diagram is reproduced here as FIG. 6. (In this figure, the blocks with rounded corners typically represent functions or process operations, while sharp-cornered rectangles typically represent stored data or memory.)

Such pipeline diagrams convey the process of rendering but do not describe any particular hardware. This document presents a new graphics pipeline that shares some of the steps of the generic 3D-graphics pipeline. Each of the steps in the generic 3D-graphics pipeline is briefly explained here. (Processing of polygons is assumed throughout this document, but other methods for describing 3D geometry could be substituted. For simplicity of explanation, triangles are used as the type of polygon in the described methods.)

As seen in FIG. 6, the first step within the floating point-intensive functions of the generic 3D-graphics pipeline after the data input (step 612) is the transformation step (step 614), described above. The transformation step also includes "get next polygon."

The second step, the clip test, checks the polygon to see if it is at least partially contained in the view volume (sometimes shaped as a frustum) (step 616). If the polygon is not in the view volume, it is discarded. Otherwise, processing continues.

The third step is face determination, where polygons facing away from the viewing point are discarded (step 618). Generally, face determination is applied only to objects that are closed volumes.

The fourth step, lighting computation, generally includes the set up for Gouraud shading and/or texture mapping with multiple light sources of various types but could also be set up for Phong shading or one of many other choices (step 622).

The fifth step, clipping, deletes any portion of the polygon that is outside of the view volume because that portion would not project within the rectangular area of the viewing plane (step 624). Conventionally, coordinates including color texture coordinates must be created for each new primative. Polygon clipping is computationally expensive.

The sixth step, perspective divide, does perspective correction for the projection of objects onto the viewing plane (step 626). At this point, the points representing vertices of polygons are converted to pixel-space coordinates by step seven, the screen space conversion step (step 628).

The eighth step (step 632), set up for an incremental render, computes the various begin, end and increment values needed for edge walking and span interpolation (e.g.: x, y and z coordinates, RGB color, texture map space, u and v coordinates and the like).

Within the drawing-intensive functions, edge walking (step 634) incrementally generates horizontal spans for each raster line of the display device by incrementing values from the previously generated span (in the same polygon), thereby "walking" vertically along opposite edges of the polygon. Similarly, span interpolation (step 636) "walks" horizontally along a span to generate pixel values, including a z-coordinate value indicating the pixel's distance from the viewing point. Finally, the z-test and/or alpha blending (also referred to as Testing and Blending) (step 638) generates a final pixel-color value. The pixel values also include color values, which can be generated by simple Gouraud shading (that is to say, interpolation of vertex-color values) or by more computationally expensive techniques such as texture mapping (possibly using multiple texture maps blended together), Phong shading (that is to say, per-fragment lighting) and/or bump mapping (perturbing the interpolated surface normal).

After drawing-intensive functions are completed, a double-buffered MUX output look-up table operation is performed (step 644). The generic 3D-graphics pipeline includes a double-buffered framebuffer, so a double-buffered MUX is also included. An output lookup table is included for translating color-map values.

By comparing the generated z-coordinate value to the corresponding value stored in the Z Buffer, the Z-test either keeps the new pixel values (if it is closer to the viewing point than previously stored value for that pixel location) by writing it into the framebuffer or discards the new pixel values (if it is farther).

At this step, antialiasing methods can blend the new pixel color with the old pixel color. The z-buffered blend generally includes most of the per-fragment operations, described below.

Finally, digital-to-analog conversion makes an analog signal for input to the display device.

The language of the OpenGL API is adopted, except as contraindicated herein. (See, for example, Open Architecture Review Board, *OpenGL Reference Manual,* 2nd edition (Addison-Wesley Developers Press, 1996) and OpenGL Architecture Review Board, *OpenGL Programming Guide,* 2nd edition (Addison-Wesley, 1997), both incorporated herein by reference.

These and other goals of the invention will be readily apparent to one of skill in the art on reading the background above and the description below.

SUMMARY

Herein are described apparatus and methods for rendering 3D-graphics images. In one embodiment, the apparatus include a port for receiving commands from a graphics application, an output for sending a rendered image to a display and a geometry-operations pipeline, coupled to the port and to the output, the geometry-operations pipeline including a block for performing transformations.

In one embodiment, the block for performing transformations includes a co-extensive logical and first physical stages, as well as a second physical stage including multiple logical stages. The second physical stage includes multiple logical stages that interleave their execution.

BRIEF DESCRIPTION OF THE DRAWINGS

FIG. 10 demonstrates how the pixel block processes a stamp's worth of fragments.

FIG. 11 illustrates the stage A data-path elements, and FIG. 12 illustrates the instruction controller.

DESCRIPTION OF SPECIFIC EMBODIMENTS

Abbreviations

Figure 1:
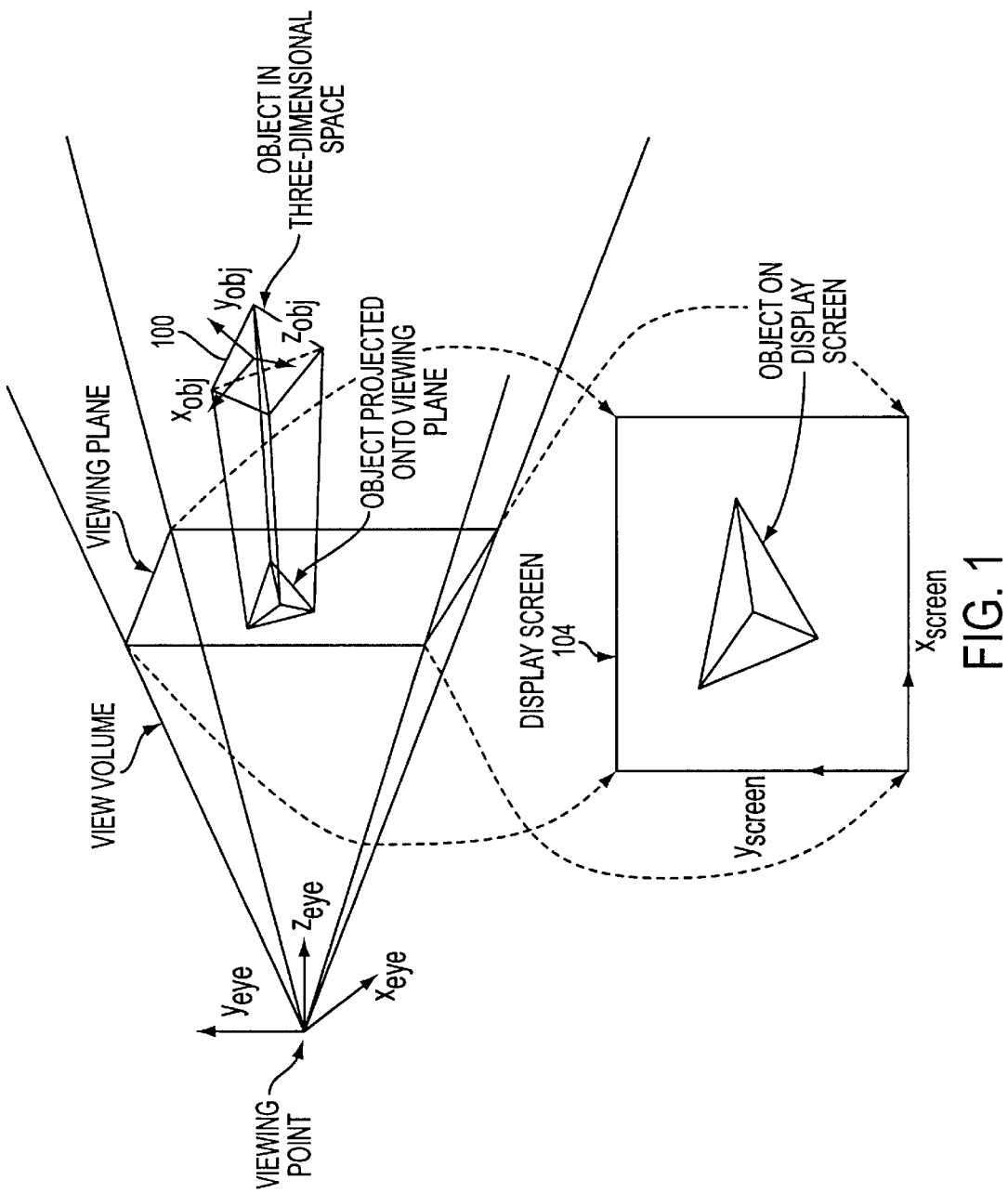
FIG. 1 shows a three-dimensional object, a tetrahedron, in various coordinate systems.

Following are abbreviations which may appear in this description, along with their expanded meaning:

BKE: the back-end block 84C.
CFD: the command-fetch-and-decode block 841.
CUL: the cull block 846.
GEO: the geometry block 842.
MEX: the mode-extraction block 843.
MIJ: the mode-injection block 847.
PHG: the Phong block 84A.
PIX: the pixel block 84B.
PXO: the pixel-out block 280.
SRT: the sort block 844.
TEX: the texture block 849.
VSP: a visible stamp portion.

Overview

The Rendering System

Figure 8:
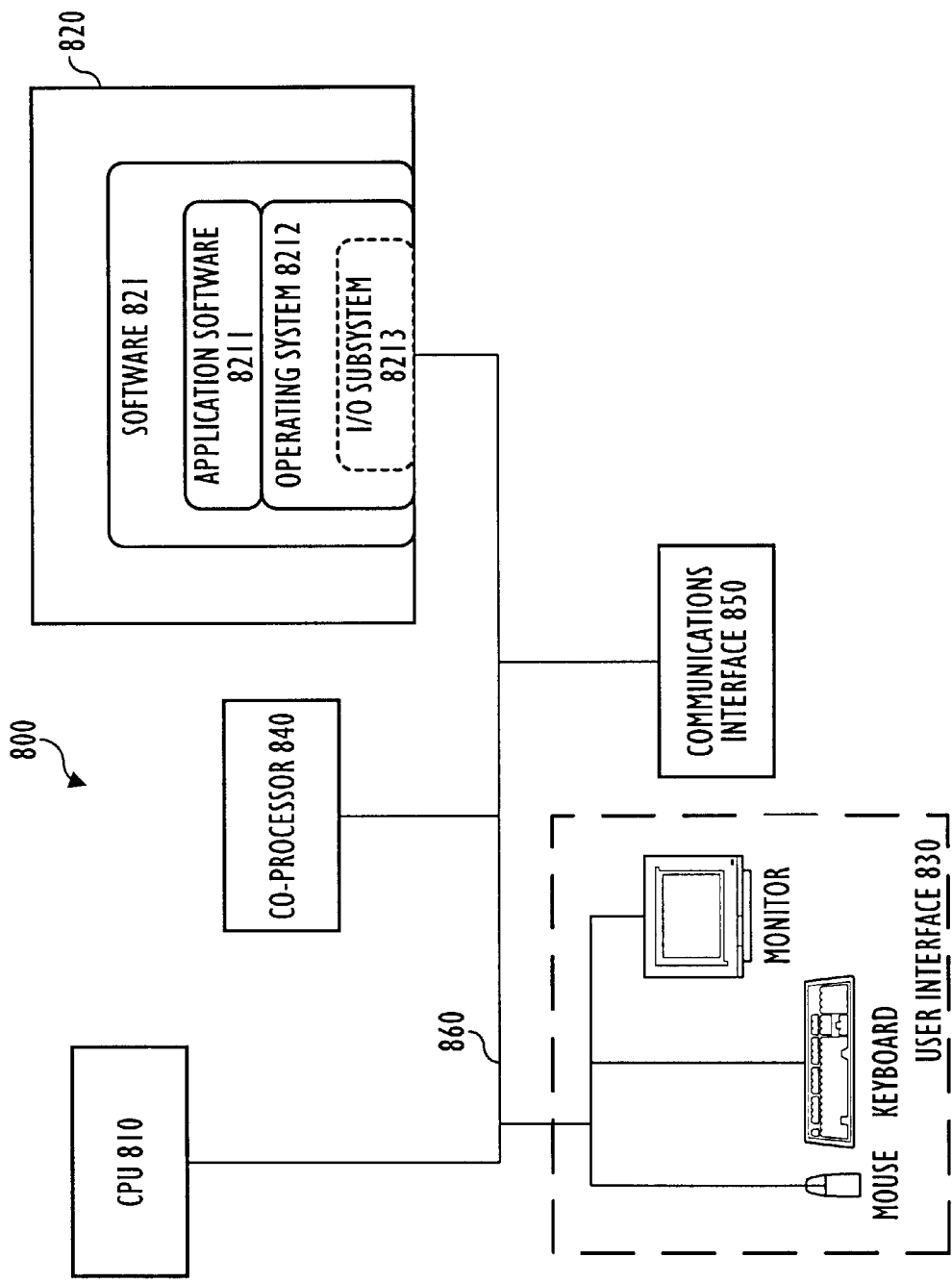
FIG. 8 illustrates a system for rendering three-dimensional graphics images.

FIG. 8 illustrates a system 800 for rendering three-dimensional graphics images. The rendering system 800 includes one or more of each of the following: data-processing units (CPUs) 810, memory 820, a user interface 830, a co-processor 840 such as a graphics processor, communication interface 850 and communications bus 860.

Of course, in an embedded system, some of these components may be missing, as is well understood in the art of embedded systems. In a distributed computing environment, some of these components may be on separate physical machines, as is well understood in the art of distributed computing.

The memory 820 typically includes high-speed, volatile random-access memory (RAM), as well as non-volatile memory such as read-only memory (ROM) and magnetic disk drives. Further, the memory 820 typically contains software 821. The software 821 is layered: Application software 8211 communicates with the operating system 8212, and the operating system 8212 communicates with the I/O subsystem 8213. The I/O subsystem 8213 communicates with the user interface 830, the co-processor 840 and the communications interface 850 by means of the communications bus 860.

The user interface 830 includes a display monitor 831.

The communications bus 860 communicatively interconnects the CPU 810, memory 820, user interface 830, graphics processor 840 and communication interface 850.

As noted earlier, U.S. Pat. No. 4,996,666 describes SAMs, which may be used to implement memory portions in the present invention, for example in the graphics unit.

The address space of the co-processor 840 may overlap, be adjacent to and/or disjoint from the address space of the memory 820, as is well understood in the art of memory mapping. If, for example, the CPU 810 writes to an accelerated graphics port at a predetermined address and the graphics co-processor 840 reads at that same predetermined address, then the CPU 810 can be said to be writing to a graphics port and the graphics processor 840 to be reading from such a graphics port.

Figure 3:
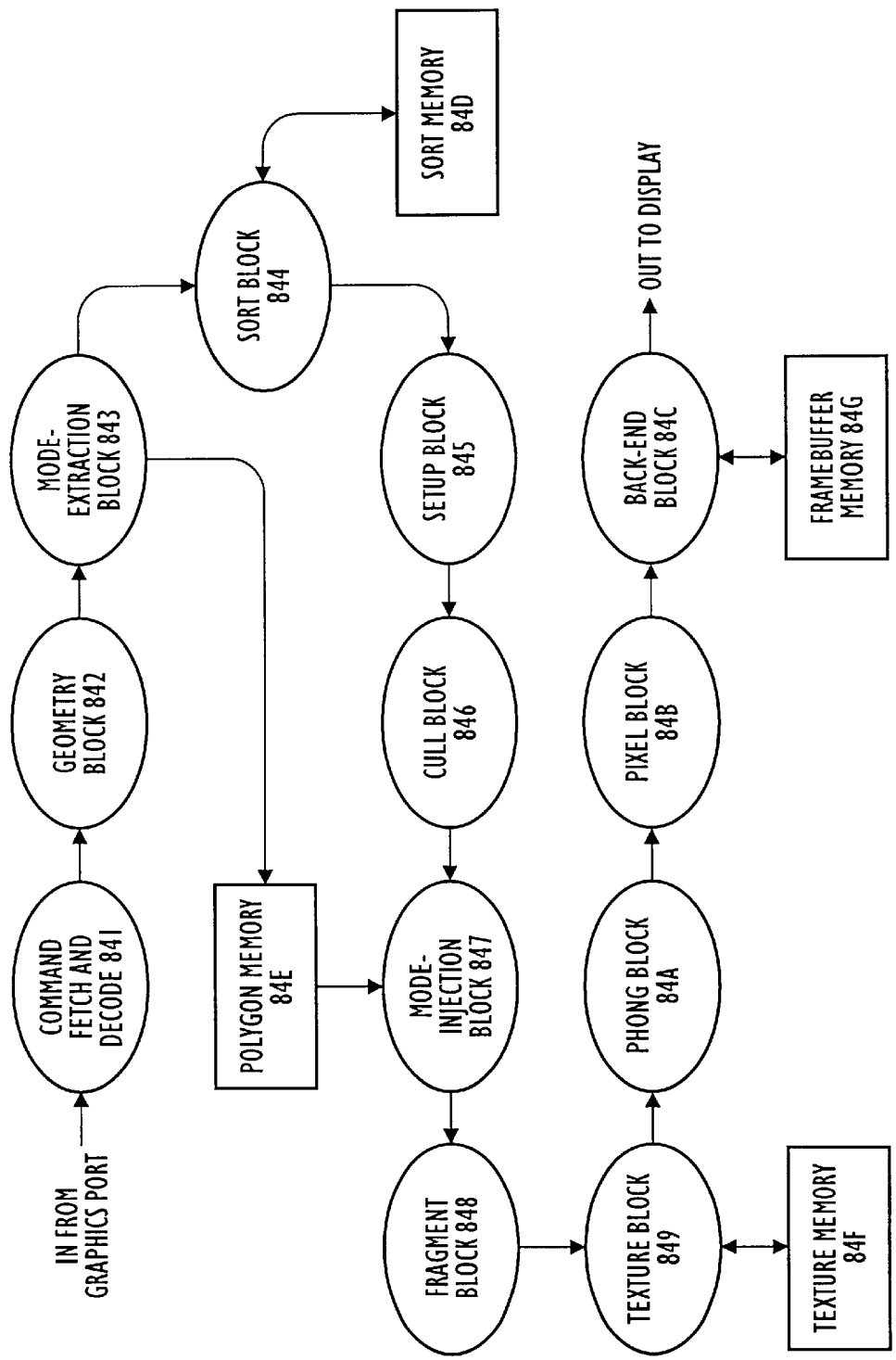
FIG. 3 is a high-level block diagram illustrating the components and data flow in a 3D-graphics pipeline incorporating the invention.

The graphics processor 840 is implemented as a graphics pipeline, this pipeline itself possibly containing one or more pipelines. FIG. 3 is a high-level block diagram illustrating the components and data flow in a 3D-graphics pipeline 840 incorporating the invention. The 3D-graphics pipeline 840 includes a command-fetch-and-decode block 841, a geometry block 842, a mode-extraction block 843, a sort block 844, a setup block 845, a cull block 846, a mode-injection block 847, a fragment block 848, a texture block 849, a Phong block 84A, a pixel block 84B, a back-end block 84C and sort, polygon, texture and framebuffer memories 84D, 84E, 84F, 84G. The memories 84D, 84E, 84F, 84G may be a part of the memory 820.

The command-fetch-and-decode block 841 handles communication with the host computer through the graphics port. It converts its input into a series of packets,, which it passes to the geometry block 842. Most of the input stream consists of geometrical data, that is to say, vertices that describe lines, points and polygons. The descriptions of these geometrical objects can include colors, surface normals, texture coordinates and so on. The input stream also contains rendering information such as lighting, blending modes and buffer functions.

The geometry block 842 handles four major tasks: transformations, decompositions of all polygons into triangles, clipping and per-vertex lighting calculations for Gouraud shading. Block 842 preferably also generates texture coordinates including bi-normals and tangents.

The geometry block 842 transforms incoming graphics primitives into a uniform coordinate space ("world space"). It then clips the primitives to the viewing volume ("frustum"). In addition to the six planes that define the viewing volume (left, right, top, bottom, front and back), the Subsystem provides six user-definable clipping planes. Preferably vertex color is computed before clipping. Thus, before clipping, geometry block 842 breaks polygons with more than three vertices into sets of triangles, to simplify processing Finally, if there is any Gouraud shading in the frame, the geometry block 842 calculates the vertex colors that the fragment block 848 uses to perform the shading.

The mode-extraction block 843 separates the data stream into two parts: vertices and everything else. Vertices are sent to the sort block 844. Everything else (lights, colors, texture coordinates, etc.), it stores in the polygon memory 84E, whence it can be retrieved by the mode-injection block 847. The polygon memory 84E is double buffered, so the mode-injection block 847 can read data for one frame while the mode-extraction block 843 is storing data for the next frame.

The mode data stored in the polygon memory falls into three major categories: per-frame data (such as lighting), per-primitive data (such as material properties) and per-vertex data (such as color). The mode-extraction and mode-injection blocks 843, 847 further divide these categories to optimize efficiency.

For each vertex, the mode-extraction block 843 sends the sort block 844 a packet containing the vertex data and a pointer (the "color pointer") into the polygon memory 84E.

The packet also contains fields indicating whether the vertex represents a point, the endpoint of a line or the corner of a triangle. The vertices are sent in a strictly time-sequential order, the same order in which they were fed into the pipeline. Vertice data also encompasses vertices created by clipping. The packet also specifies whether the current vertex forms the last one in a given primitive, that is to say, whether it completes the primitive. In the case of triangle strips ("fans") and line strips ("loops"), the vertices are shared between adjacent primitives. In this case, the packets indicate how to identify the other vertices in each primitive.

The sort block 844 receives vertices from the mode-extraction block 843 and sorts the resulting points, lines and triangles by tile. (A tile is a data structure described further below.) In the double-buffered sort memory 84D, the sort block 844 maintains a list of vertices representing the graphic primitives and a set of tile pointer lists, one list for each tile in the frame. When the sort block 844 receives a vertex that completes a primitive, it checks to see which tiles the primitive touches. For each tile a primitive touches, the sort block adds a pointer to the vertex to that tile's tile pointer list.

When the sort block 844 has finished sorting all the geometry in a frame, it sends the data to the setup block 845. Each sort-block output packet represents a complete primitive. The sort block 844 sends its output in tile-by-tile order: all of the primitives that touch a given tile, then all of the primitives that touch the next tile, and so on. Thus, the sort block 844 may send the same primitive many times, once for each tile it touches.

The setup block 845 calculates spatial derivatives for lines and triangles. The block 845 processes one tile's worth of data, one primitive at a time. When the block 845 is done, it sends the data on to the cull block 846.

The setup block 845 also breaks stippled lines into separate line segments (each a rectangular region) and computes the minimum z value for each primitive within the tile.

Each packet output from the setup block 845 represents one primitive: a triangle, line segment or point.

The cull block 846 accepts data one tile's worth at a time and divides its processing into two steps: SAM culling and sub-pixel culling. The SAM cull discards primitives that are hidden completely by previously processed geometry. The sub-pixel cull takes the remaining primitives (which are partly or entirely visible) and determines the visible fragments. The sub-pixel cull outputs one stamp's worth of fragments at a time, herein a "visible stamp portion." (A stamp is a data structure described further below.)

Figure 9:
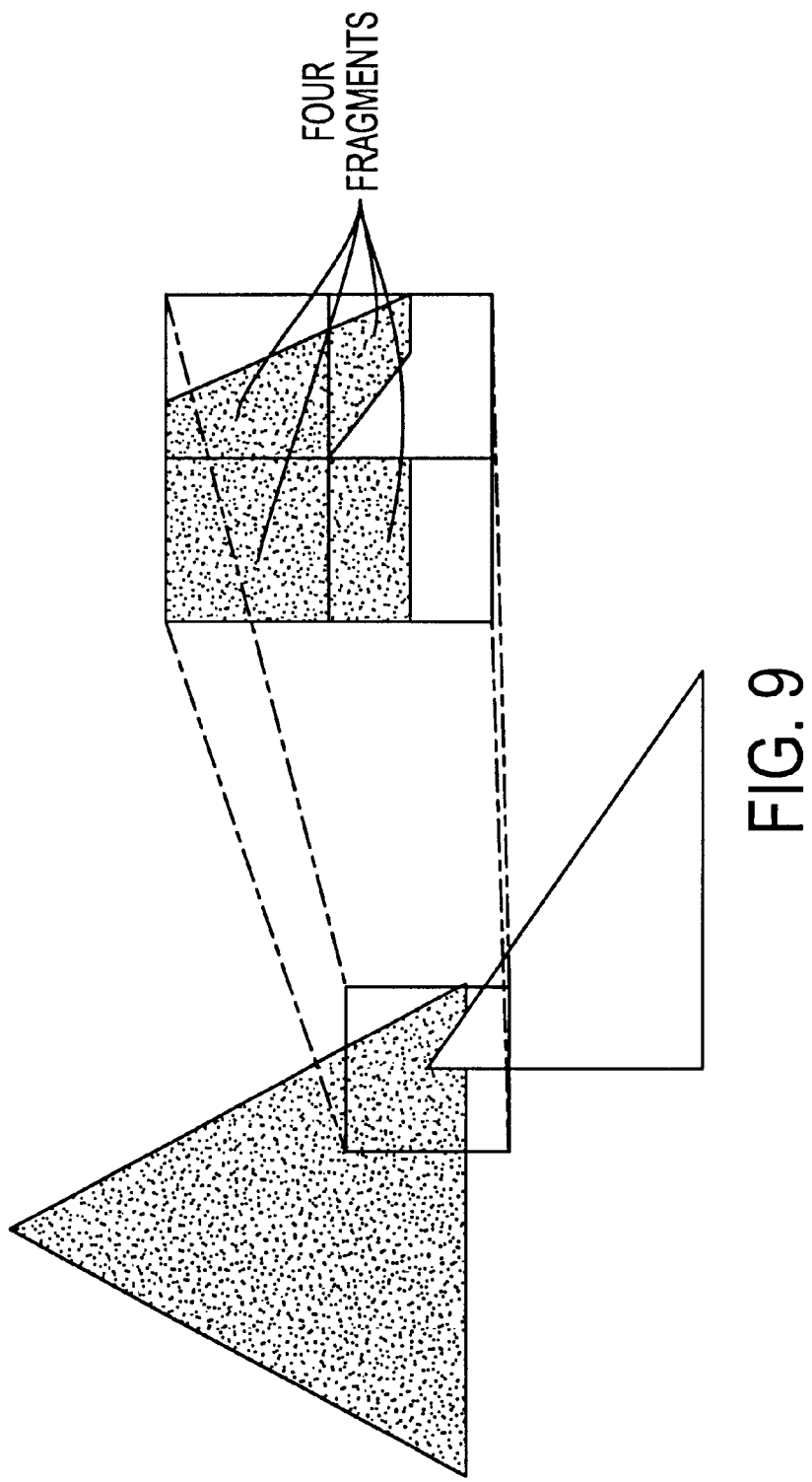
FIG. 9 shows an example of how the cull block produces fragments from a partially obscured triangle.

FIG. 9 shows an example of how the cull block 846 produces fragments from a partially obscured triangle. A visible stamp portion produced by the cull block 846 contains fragments from only a single primitive, even if multiple primitives touch the stamp. Therefore, in the diagram, the output VSP contains fragments from only the gray triangle. The fragment formed by the tip of the white triangle is sent in a separate VSP, and the colors of the two VSPs are combined later in the pixel block 84B.

Each pixel in a VSP is divided into a number of samples to determine how much of the pixel is covered by a given fragment. The pixel block 84B uses this information when it blends the fragments to produce the final color of the pixel.

The mode-injection block 847 retrieves block-mode information (colors, material properties, etc.) from the polygon memory 84E and passes it downstream as required. To save bandwidth, the individual downstream blocks cache recently used mode information. The mode-injection block 847 keeps track of what information is cached downstream and only sends information as necessary.

The main work of the fragment block 848 is interpolation. The block 848 interpolates color values for Gouraud shading, surface normals for Phong shading and texture coordinates for texture mapping. It also interpolates surface tangents for use in the bump-mapping algorithm if bump maps are in use.

The fragment block 848 performs perspective-corrected interpolation using barycentric coefficients, and preferably also handles texture level of detail manipulations.

The texture block 849 applies texture maps to the pixel fragments. Texture maps are stored in the texture memory 84F. Unlike the other memory stores described previously, the texture memory 84F is single buffered. It is loaded from the memory 820 using the graphics port interface.

Textures are mip-mapped. That is to say, each texture comprises a series of texture maps at different levels of detail, each map representing the appearance of the texture at a given distance from the eye point. To reproduce a texture value for a given pixel fragment, the text block 849 performs tri-linear interpolation from the texture maps, to approximate the correct level of detail. The texture block 849 also performs other interpolation methods, such as anisotropic interpolation.

The texture block 849 supplies interpolated texture values (generally as RGBA color values) to the Phong block 84A on a per-fragment basis. Bump maps represent a special kind of texture map. Instead of a color, each texel of a bump map contains a height field gradient or a normal vector.

The Phong block 84A performs Phong shading for each pixel fragment. It uses the material and lighting information supplied by the mode-injection block 847, the texture colors from the texture block 849 and the surface normal generated by the fragment block 848 to determine the fragment's apparent color. If bump mapping is in use, the Phong block 847 uses the interpolated height field gradient from the texture block 849 to perturb the fragment's surface normal before shading.

The pixel block 84B receives VSPs, where each fragment has an independent color value. The pixel block 84B performs a scissor test, an alpha test, stencil operations, a depth test, blending, dithering and logic operations on each sample in each pixel. When the pixel block 84B has accumulated a tile's worth of finished pixels, it blends the samples within each pixel (thereby performing antialiasing of pixels) and sends then to the back end 84C for storage in the framebuffer 84G.

FIG. 10 demonstrates how the pixel block 84B processes a stamp's worth of fragments. In this example, the pixel block receives two VSPs, one from a gray triangle and one from a white triangle. It then blends the fragments and the background color to produce the final pixels. The block 84B weights each fragment according to how much of the pixel it covers or, to be more precise, by the number of samples it covers.

(The pixel-ownership test is a part of the window system and is left to the back end 84C.)

The back-end block 84C receives a tile's worth of pixels at a time from the pixel block 84B and stores them into the framebuffer 84G. The back end 84C also sends a tile's worth of pixels back to the pixel block 84B because specific framebuffer values can survive from frame to frame. For example, stencil-bit values can remain constant over many frames but can be used in all of those frames.

In addition to controlling the framebuffer 84G, the back-end block 84C performs pixel-ownership tests, 2D drawing and sends the finished frame to the output devices. The block 84C provides the interface between the framebuffer 84G and the monitor 831 and video output.

The Geometry Block

The geometry block 842 is the first computation unit at the front end of the graphical pipeline 840. The engine 842 deals mainly with per-vertex operations, like the transformation of vertex coordinates and normals. The Frontend deals with fetching and decoding the Graphics Hardware Commands. The Frontend loads the necessary transform matrices, material and light parameters and other mode settings into the input registers of the geometry block 842. The geometry block 842 sends transformed vertex coordinates, normals, generated and/or transformed texture coordinates and per-vertex colors to the mode-extraction and sort blocks 843, 844. The mode-extraction block 843 stores the "color" data and modes in the polygon memory 84E. The sort block 844 organizes the per-vertex "spatial" data by tile and writes it into the sort memory 84D.

Figure 2:
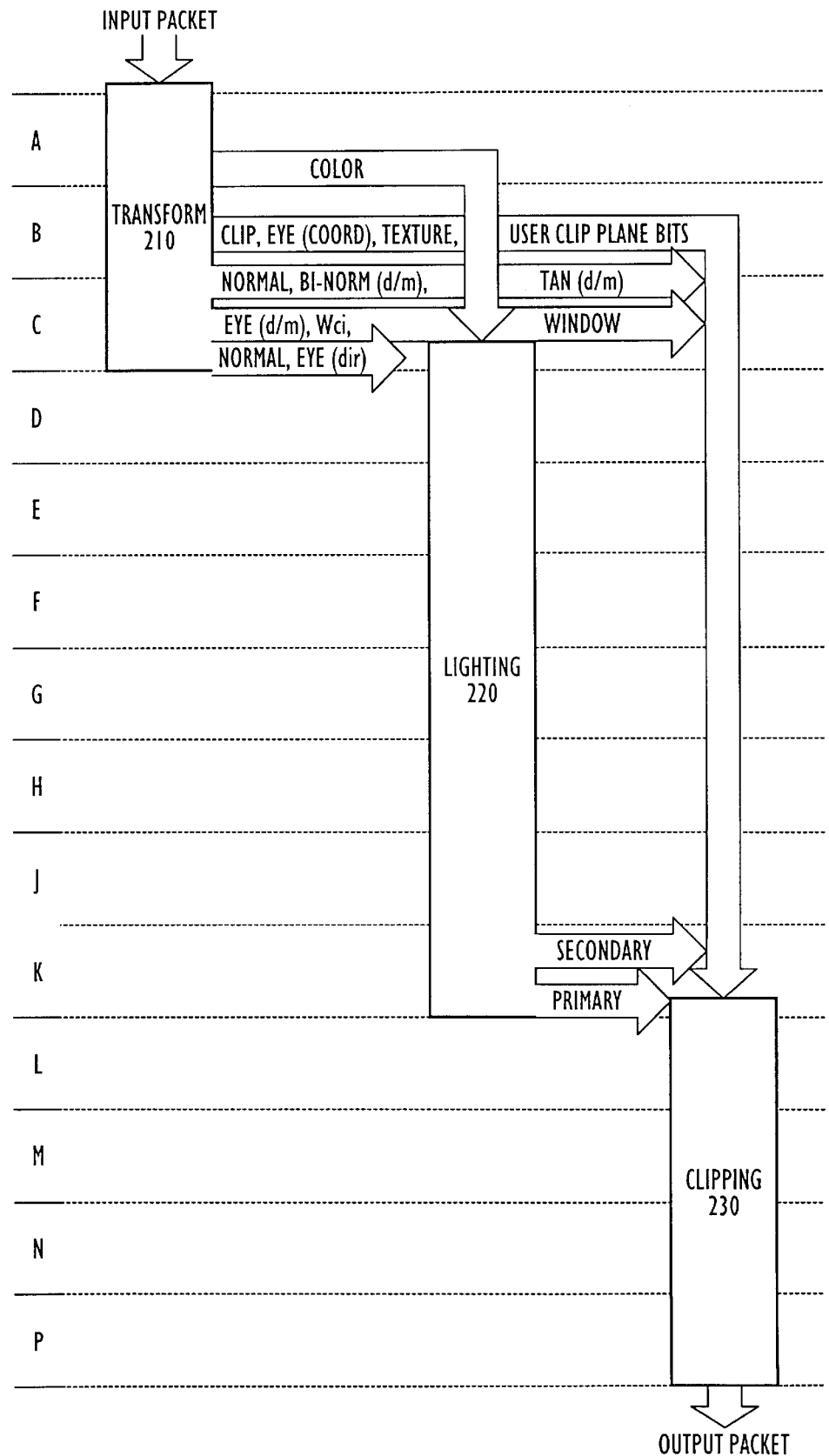
FIG. 2 is a block diagram illustrating the components and data flow in the geometry block 842.

FIG. 2 is a block diagram illustrating the components and data flow in the geometry block 842. The block 842 includes a transformation unit 210, a lighting unit 220 and a clipping unit 230. The transformation unit 210 receives data from the command-fetch-and-decode block 841 and outputs to both the lighting and the clipping units 220, 230. The lighting unit 220 outputs to the clipping unit 230. The clipping unit 230 outputs to the mode-extraction and sort blocks 843, 844.

Figure 4:
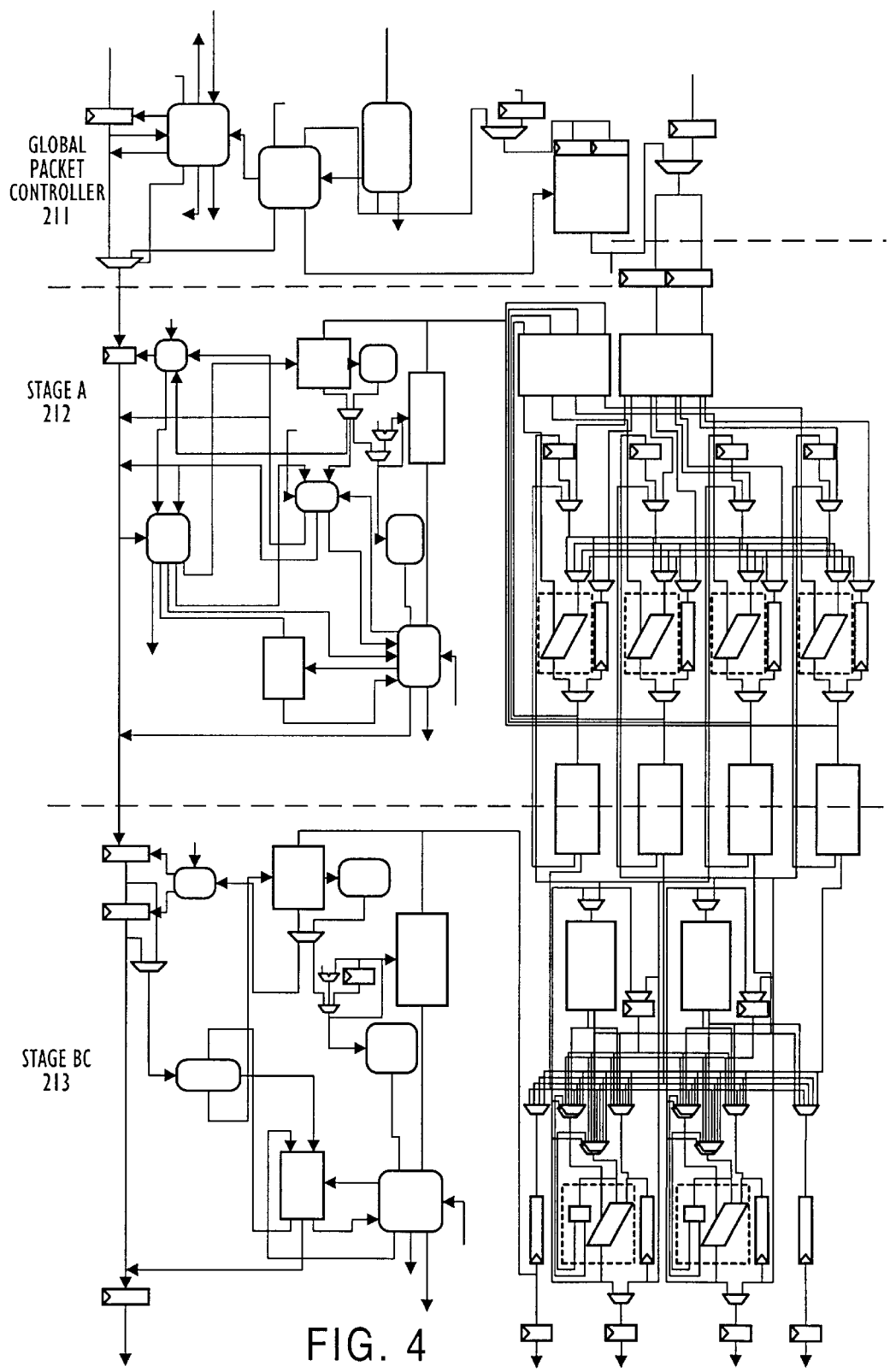
FIG. 4 is a block diagram of the transformation unit.

FIG. 4 is a block diagram of the transformation unit 210. The unit 210 includes a global packet controller 211 and two physical stages: a pipeline stage A 212 and a pipeline stage BC 213. The global packet controller 211 receives data from the command-fetch-and-decode block 841 and an auxiliary ring (not shown). The unit 212 outputs to the pipeline stage A 212. The pipeline stage A 212 outputs to the pipeline stage BC 213. The stage BC 213 outputs to the lighting and clipping units 220, 230.

Figure 13:
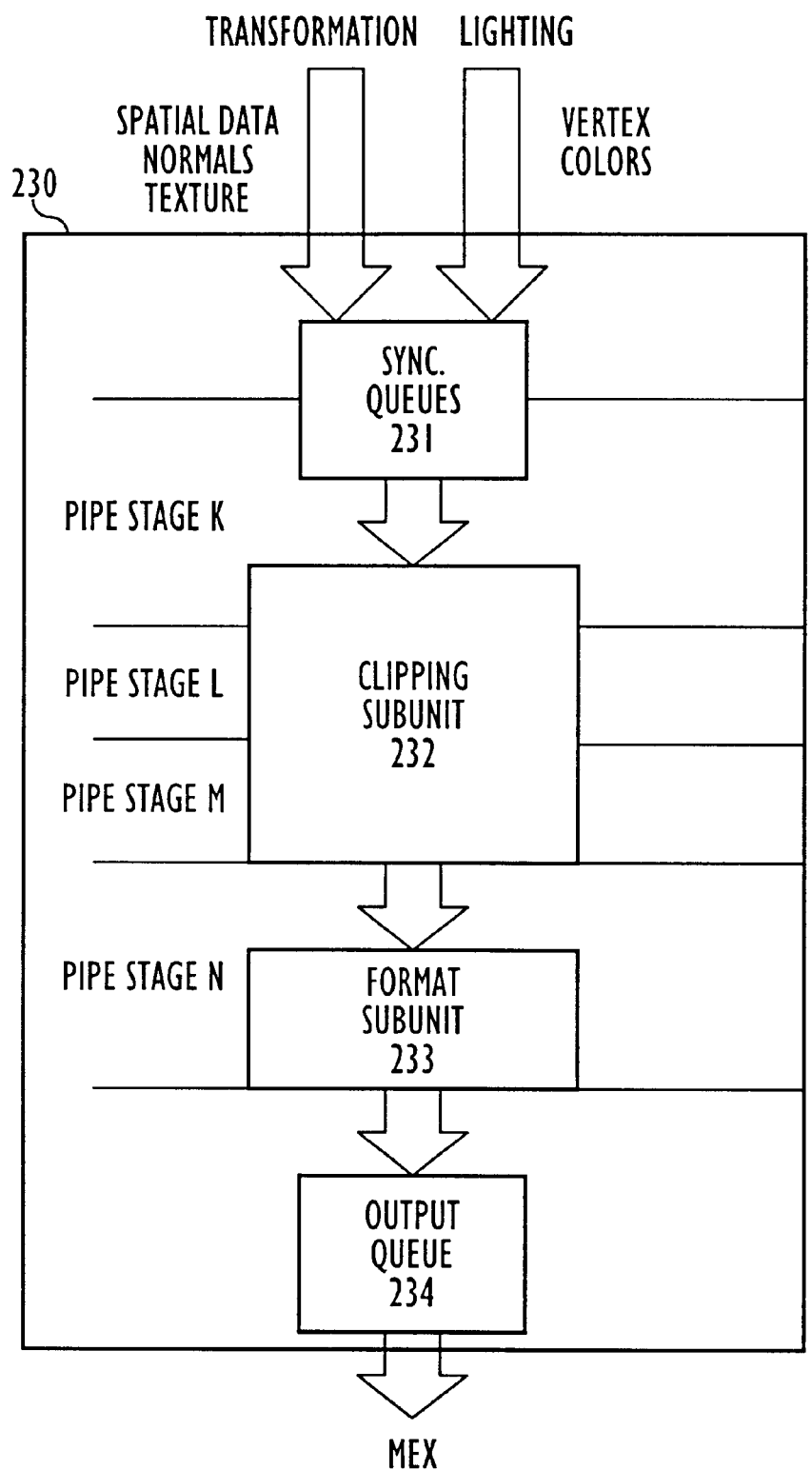
FIG. 13 is a block diagram of the clipping sub-unit.

FIG. 13 is a block diagram of the clipping sub-unit 230. The unit 230 includes synchronization queues 231, clipping and formatting sub-units 232, 233 and output queue 234. The synchronization queues 231 receive input from the transformation and lighting units 210, 220 and output to the clipping sub-unit 232. The clipping sub-unit 232 in turn outputs to the format sub-unit 233 that itself in turn outputs to the output queue 234. The queue 234 outputs to the mode-extraction block 843.

FIG. 13 also gives an overview of the pipeline stages K through N as the clipping sub-unit 230 implements them. The clipping sub-unit 233 includes three logical pipeline stages: K, L and M. The format sub-unit 234 one: N.

The output queue 234 does not work on pipeline stage boundaries. Rather, it sends out packets whenever valid data is in its queue and the mode-extraction block 843 is ready.

Figure 5:
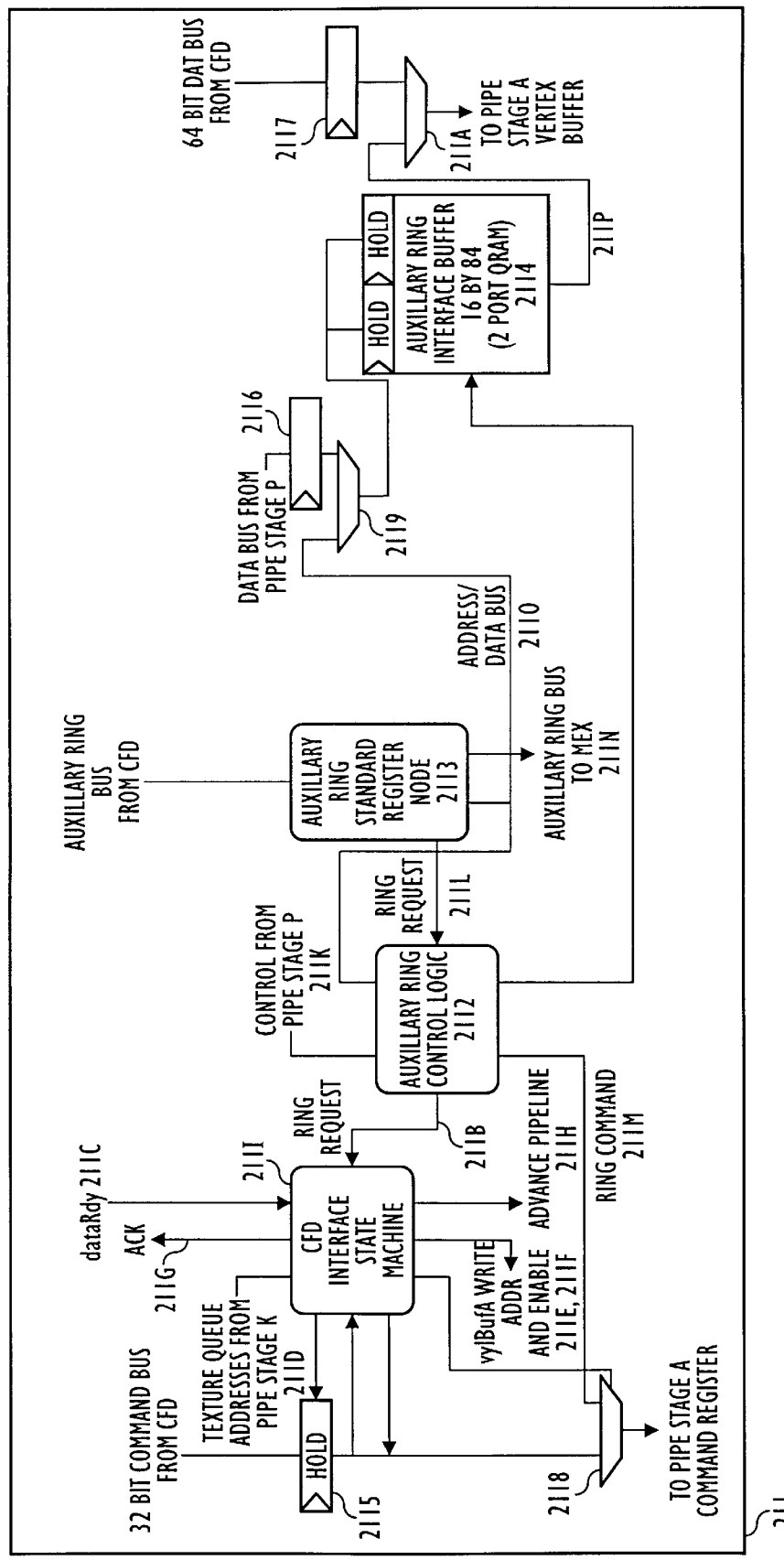
FIG. 5 is a block diagram of the global packet controller.
Figure 6:
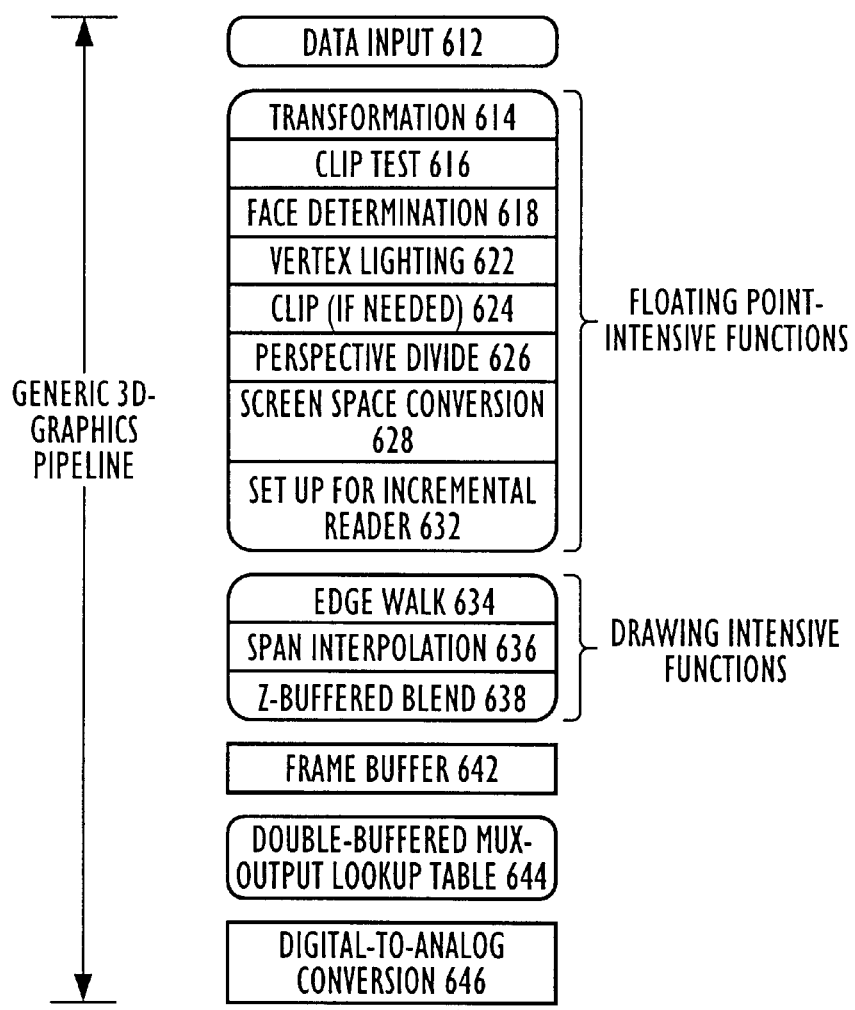
FIG. 6 is a reproduction of the Deering et al. generic 3D-graphics pipeline.
Figure 7:
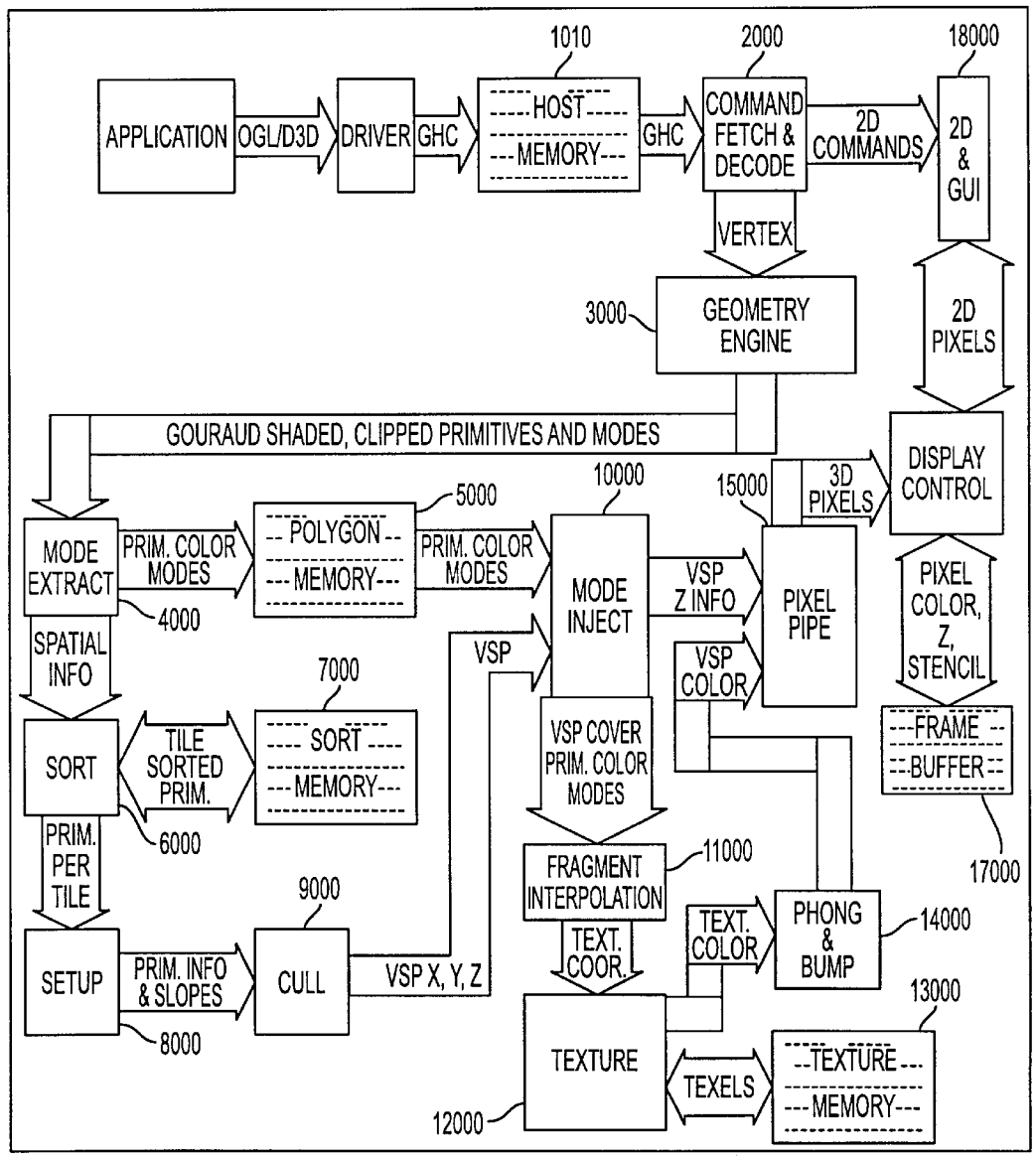
FIG. 7 is a method-flow diagram of a preferred implementation of a 3D-graphics pipeline.

FIG. 5 is a block diagram of the global packet controller 211. The controller 211 includes a CFD interface state machine 2111, an auxiliary-ring control 2112, an auxiliary-ring standard register node 2113, an auxiliary-ring interface buffer 2114, buffers 2115, 2116, 2117 and MUXes 2118, 2119, 211A.

The CFD interface state machine 2111 receives input from the command-fetch-and-decode unit 841 via the CFD command and data bus, from the auxiliary ring controller 2112 via a Ring_Request signal 211B and from a Data_Ready and Texture Queue Addresses from Pipeline Stage K signals 211D, and 211C, where signal 211C is a handshake signal between CFD and GEO. The state machine 2111 generates Write_Address and Write_Enable signals 211E, 211F as control inputs to the MUX 2118, as well as Acknowledgment and Advance_Packet/Pipeline signals 211G, 211H.

The auxiliary-ring controller 2112 receives as input a Ring_Request signal 211L from the node 2113 and Control from Pipeline Stage P 211K. The controller 2112 generates four signals: a Ring_Command 211M as input to the MUX 2118, an unnamed signal 211N as input to the buffer 2114, an Address/Data_Bus 211O as input to the MUX 2119 and the Ring_Request signal 211B input to the state machine 2111.

The auxiliary-ring standard register node 2113 receives as input the auxiliary-ring bus from the command-fetch-and-decode block 841 and the Address/Data_Bus 211O from the controller 2112. The node 2113 generates two signals: the Ring_Request signal 211L to the controller 2112 and the auxiliary-ring bus to the mode-extraction block 843.

The auxiliary-ring interface buffer 2114 receives as input the output of the MUX 2119 and the unnamed signal 211N from the controller 2112 and generates an unnamed input 211P to the MUX 211A.

The dual-input MUX 2118 receives as input the command bus from the command-fetch-and-decode command bus and the Ring_Command signal 211M from the controller 2112. Its output goes to the pipeline stage A command register.

The dual-input MUX 2119 receives as input the data bus from the pipeline stage P and the Address/Data_Bus 211O. Its outputs is the input to the buffer 2114.

The dual-input MUX 211A receives as input the unnamed signal 211P and the Data_Bus from the command-fetch-and-decode block 841. Its output goes to the pipeline stage A vertex buffer 2121.

Figure 11:
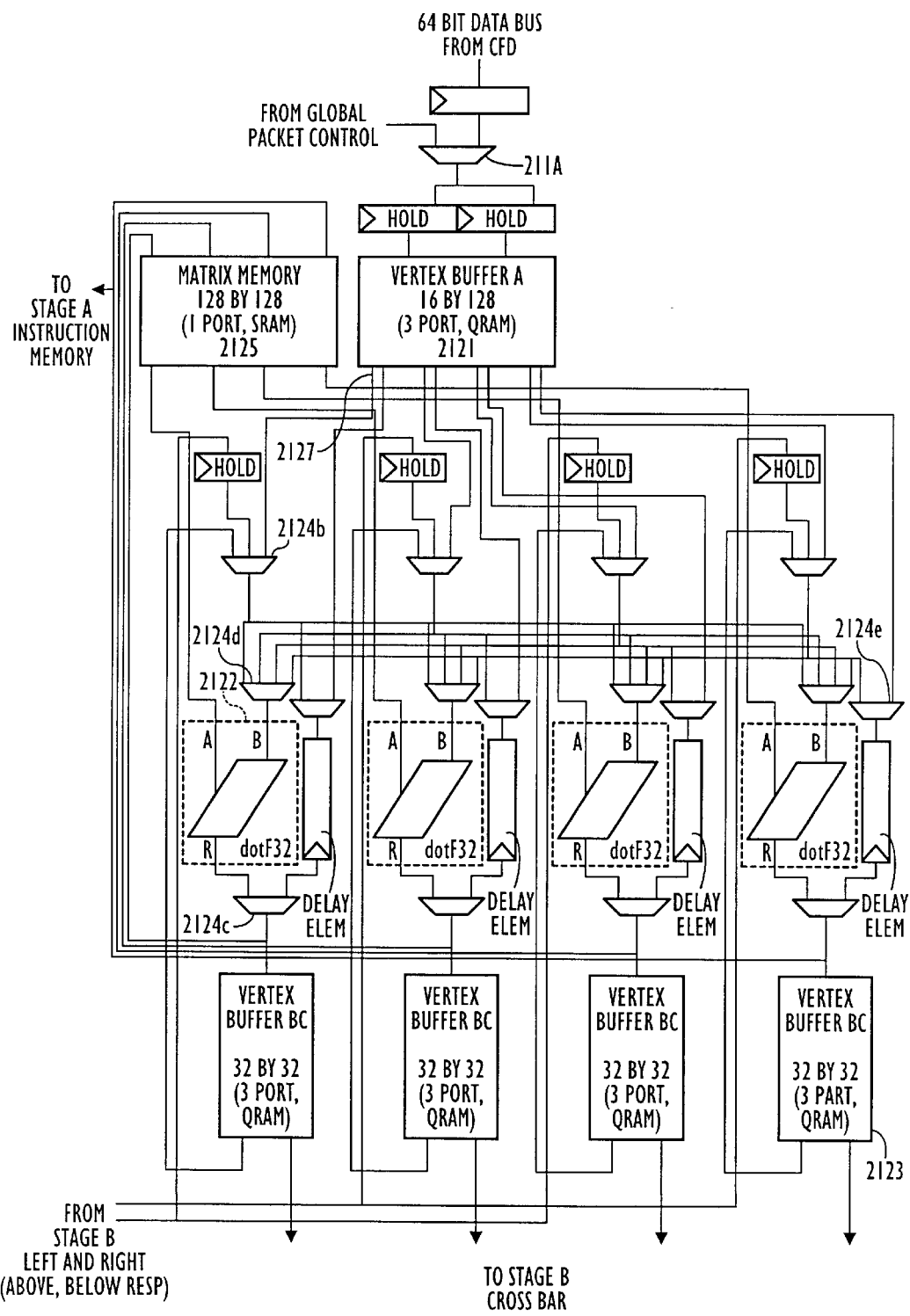
FIGS. 11 and 12 are block diagrams of the pipeline stage A.
Figure 12:
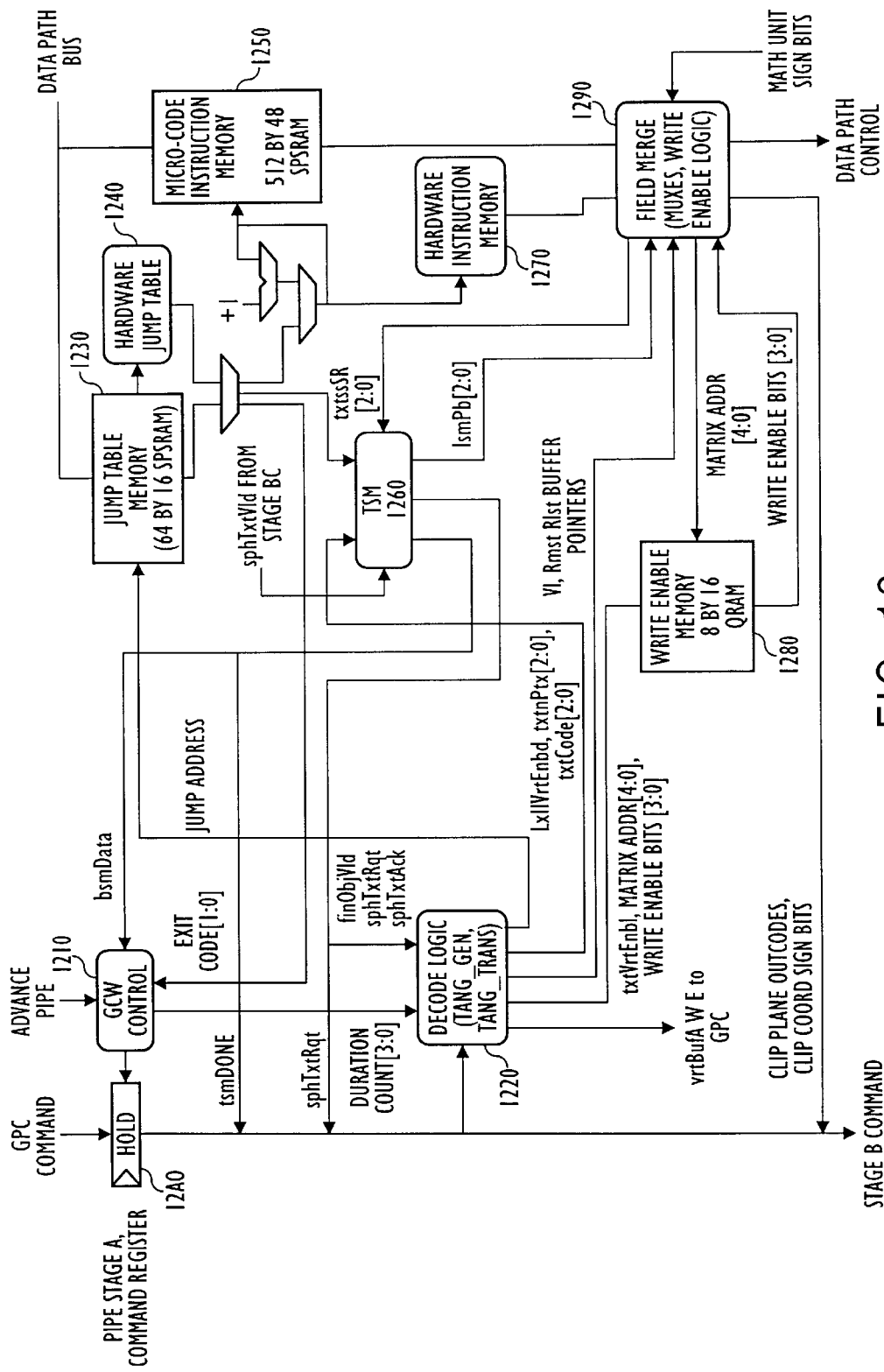

FIGS. 11 and 12 are block diagrams of the pipeline stage A 212. The stage A 212 includes an instruction controller 2126 and data-path elements including: an input buffer 2121, a matrix memory 2125, parallel math functional units 2122, an output buffer 2123 and various MUXes 2124. FIG. 11 illustrates the stage A 212 data-path elements, and FIG. 12 illustrates the instruction controller 2126.

The vertex buffer A 2121 receives as input the output of the global packet controller MUX 211A and generates outputs 2127 to the four SerMod_F32 serial dot-product generators 2122 through the MUXes 2124b and 2124d.

The vertex buffer A 2121 also generates outputs 2126 that, through the MUXes 2124e, the delay elements 2127 and the MUXes 2124c, form the bus 2125. The bus 2125 feeds the vertex buffers BC 2123 and the matrix memory 2125.

The matrix memory 2125 receives as input the output 2125 of the MUXes 2124c and generate as output the A input for the parallel serial dot-product generators 2122.

The serial dot-product generators 2122 receives as their A inputs the output of the matrix memory 2125 and as their B inputs the outputs of the MUXes 2124d. The products generated are inputs to the MUXes 2124c.

The vertex buffers BC 2123 receive as inputs the bus 2125 output from the MUXes 2124c and generate two outputs: an input to the MUXes 2124b and an output to the stage B cross bar.

The vertex buffers 2121, 2123 are double buffers, large enough to hold two full-performance-vertex worth of data.

The tri-input MUXes 2124b receive as inputs an unnamed signal from stage B, an output from the vertex buffers BC 2123, and the output 2127 from the vertex buffer A 2121. The outputs of the MUXes 2124b are inputs to respective MUXes 2124d.

Each of the quad-input MUXes 2124d receives as inputs the four outputs of the four MUX 2124b. The output of a MUX 2124d is the B input of a respective serial dot-product generator 2122.

Each of the bi-input MUXes 2124e receives as inputs the output of a respective MUX 2124b and an output 2126 of the vertex buffer A 2121. The output of a MUX 2124e is the input of respective delay element 2127.

The input of a delay element 2127 is the output of a respective MUX 2124e, and the output of the element 2127 is an input of a respective MUX 2124c.

The inputs of a bi-input MUX 2124c are the R output of a respective serial dot-product generator 2122 and the output of a respective delay element 2127.

As illustrated in FIG. 12, the instruction controller 2126 includes a geometry command word (GCW) controller 1210, a decoder 1220, a jump-table memory 1230, a jump table 1240, a microcode instruction memory 1250, a texture state machine 1260, hardware instruction memory 1270, a write-enable memory 1280, field-merge logic 1290 and a command register 12A0.

Figure 16A:
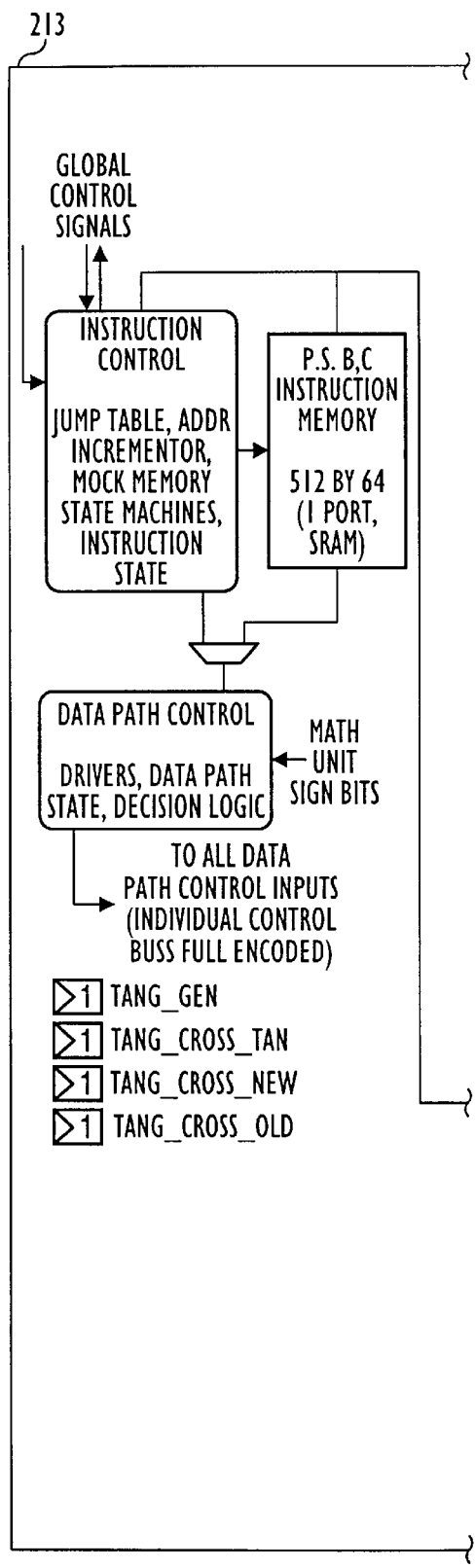
FIG. 16 illustrates the pipeline stage BC.
Figure 16B:
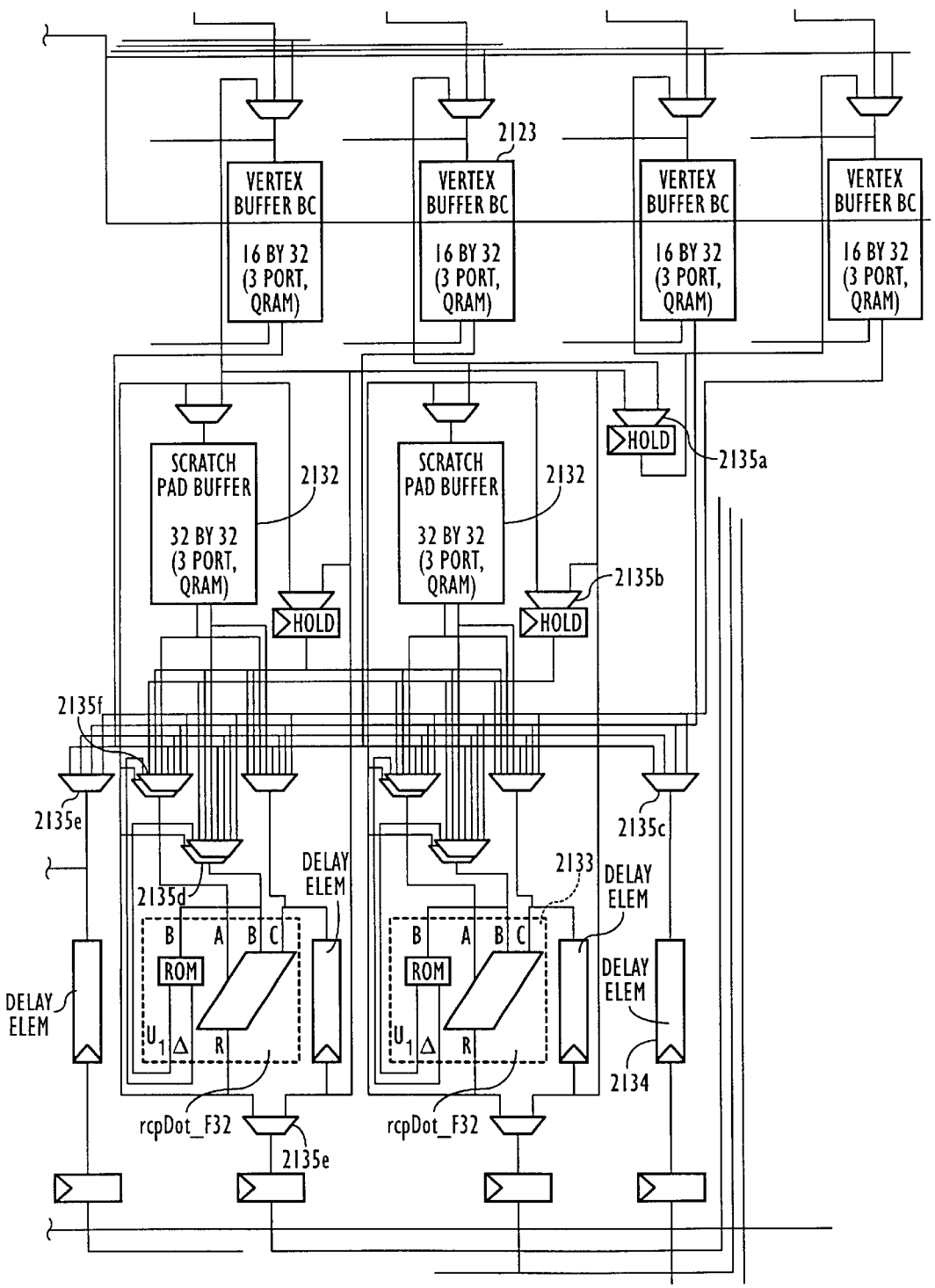

FIG. 16 illustrates the pipeline stage BC 213. The stage BC 213 includes the vertex buffers BC 2123, the scratch-pad memory 2132, the math functional units 2133, as well as the delay elements 2134, the MUXes 2135 and the registers 2136.

Figure 15:
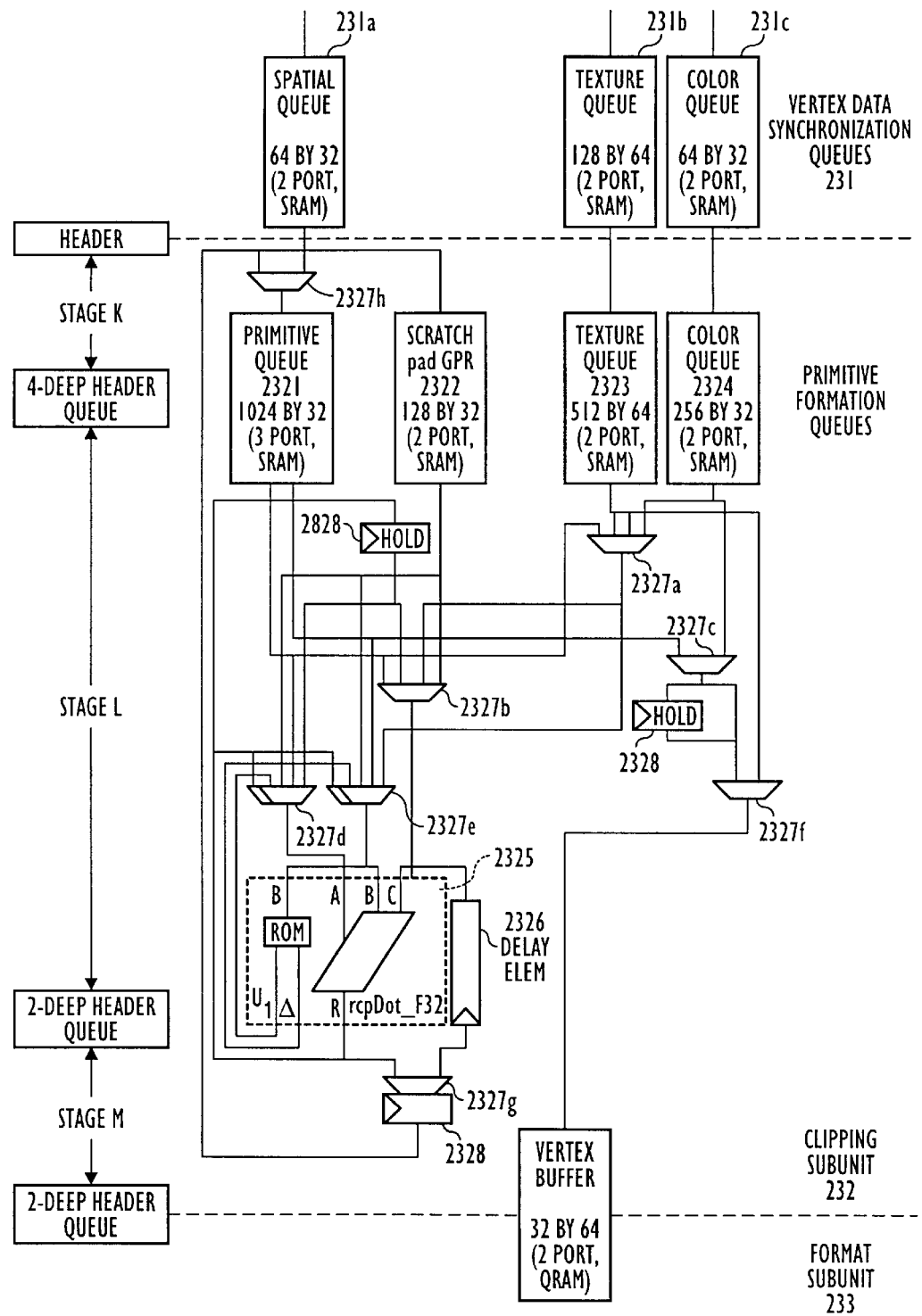
FIG. 15 is a block diagram of the synchronization queues and the clipping sub-unit.

FIG. 15 is a block diagram of the synchronization queues 231 and the clipping sub-unit 232. FIG. 15 shows the separate vertex-data synchronization queues 231a, 231b and 231c for spatial, texture and color data, respectively.

FIG. 15 also shows the primitive-formation header queues 2321, 2323, 2324 composing the clipping sub-unit 232. The sub-unit 232 also includes a scratch-pad GPR 2322, a functional math unit 2325, a delay element 2326, MUXes 2327 and registers 2328. The spatial, texture and color queues 231a–c feed into the primitive, texture and color queues 2321, 2323, 2324, respectively. (The spatial queue 231 feeds into the primitive queue 2321 through the MUX 2327h.)

The primitive queue 2321 receives input from the MUX 2327h and outputs to the MUXes 2327a, 2327d and 2327e from a first output and to the MUXes 2327c and 2327e from a second output.

The text queue 2323 outputs to the MUXes 2327a and 2327f.

The color queue 2324 outputs to the MUXes 2327a and 2327c.

The functional math unit 2325 receives input from the MUX 2327d at its A input, from the MUX 2327e at its B input and from the MUX 2327b at its C input. The outputs $U_1$ and $\Delta$ feed into the MUXes 2327d and 2327e, respectively. The output R feeds into the MUXes 2327g, 2327d, 2327e and the MUXes 2327b and 2327d (again) via a register 2328.

The delay element 2326 receives as input the output of the MUX 2327b and generates an output to the MUX 2327g.

The quad-input MUX 2327a receives input each of the primitive, texture and color queues 2321, 2323, 2324. The MUX 2327a outputs to the MUXes 327b and 2327e.

The quad-input MUX 2327b receives input from the primitive queue 2321, the scratch-pad GPR 2322, the MUX 2327a and the R output of the functional math unit 2325 via a hold register 2328. The MUX 2327b generates an output to (the C input of) the math unit 2325 and the delay element 2326.

The bi-input MUX 2327c receives as inputs the second output of the primitive queue 2321 and the output of the color queue 2324. The MUX 2327c outputs to the MUX 2327f directly and through a hold register 2328.

The quint-input MUX 2327d receives as inputs the R output of the math unit 2325, directly and through a hold register 2328, as well as the $U_1$ output of the math unit 2325, the output of the scratch-pad 2322 and the first output of the primitive queue 2321. The MUX 2327d generates an output to the A input of the math unit 2325.

The quint-input MUX 2327e receives as inputs the R output of the math unit 2325, directly and through a hold register 2328, as well as the $\Delta$ output of the math unit 2325, the output of the MUX 2327a and the second output of the primitive queue 2321. The MUX 2327e generates an output to the B inputs of the math unit 2325.

The bi-input MUX 2327f receives as inputs the output of the MUX 2327c directly and through a hold register 2328, as well as the output of the texture queue 2323. The MUX 2327e generates an output to the vertex buffer 2329 between the clipping and format sub-units 232 233.

The bi-input MUX 2327g receives as inputs the R output of the math unit 2325 and the output of the delay element 2326. The MUX 2327g generates an output into the MUX 2327h and the scratch-pad GPR through a hold register 2328.

The bi-input MUX 2327h receives as inputs the output of the MUX 2327g (through a hold register 2328) and the output of the spatial queue 231a. The output of the MUX 2327h feeds into the primitive queue 2321.

The math unit 2325 is an mathFunc-F32 dot-product generator.

Figure 17:
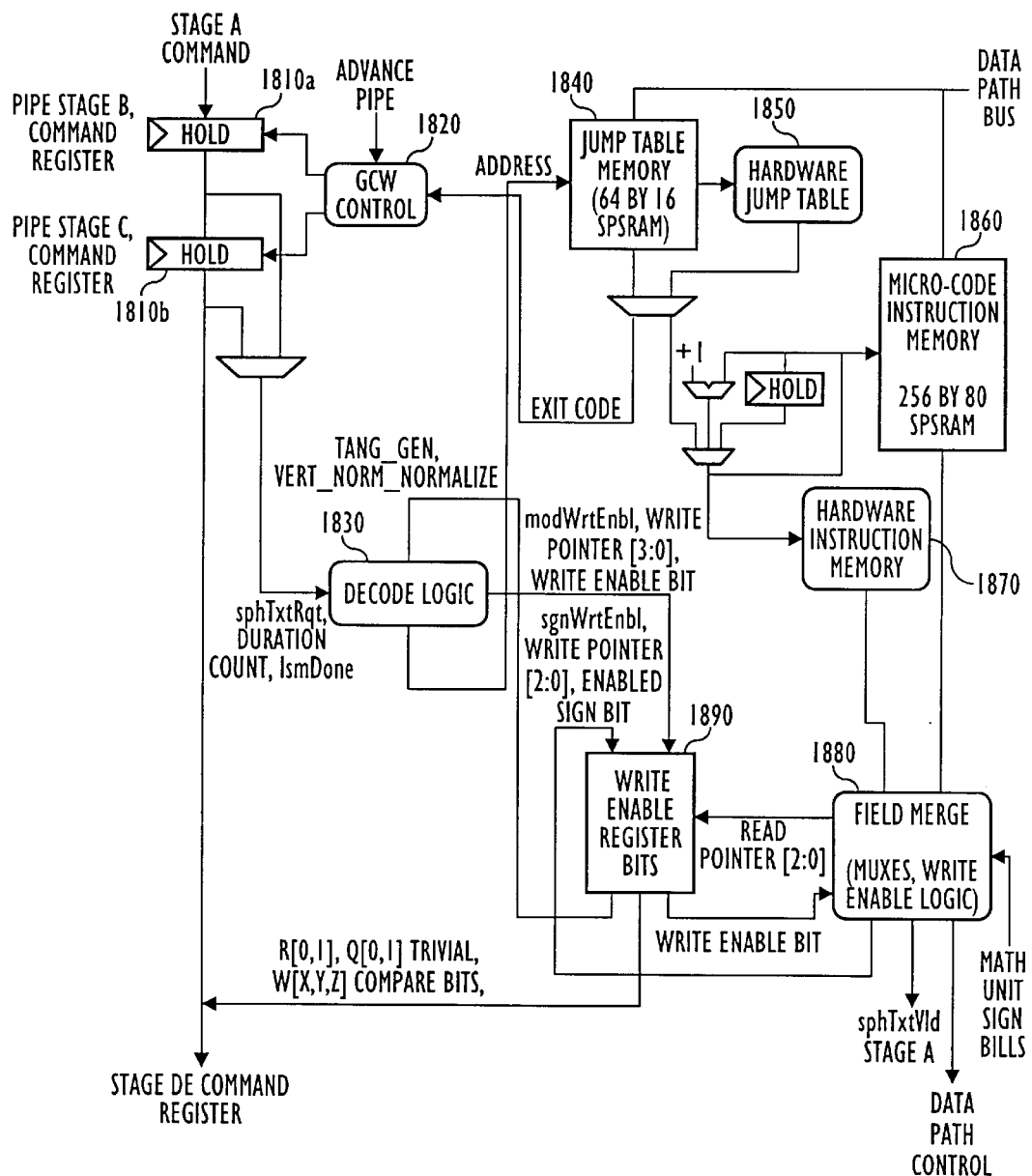
FIG. 17 is a block diagram of the instruction controller for the pipeline stage BC.

FIG. 17 is a block diagram of the instruction controller 1800 for the pipeline stage BC 213. The instruction controller 1800 includes command registers 1810, a global-command-word controller 1820, a decoder 1830, a jump-table memory 1840, hardware jump table 1850, microcode instruction memory 1860, hardware instruction memory 1870, field-merge logic 1880 and write-enable memory 1890.

Figure 14:
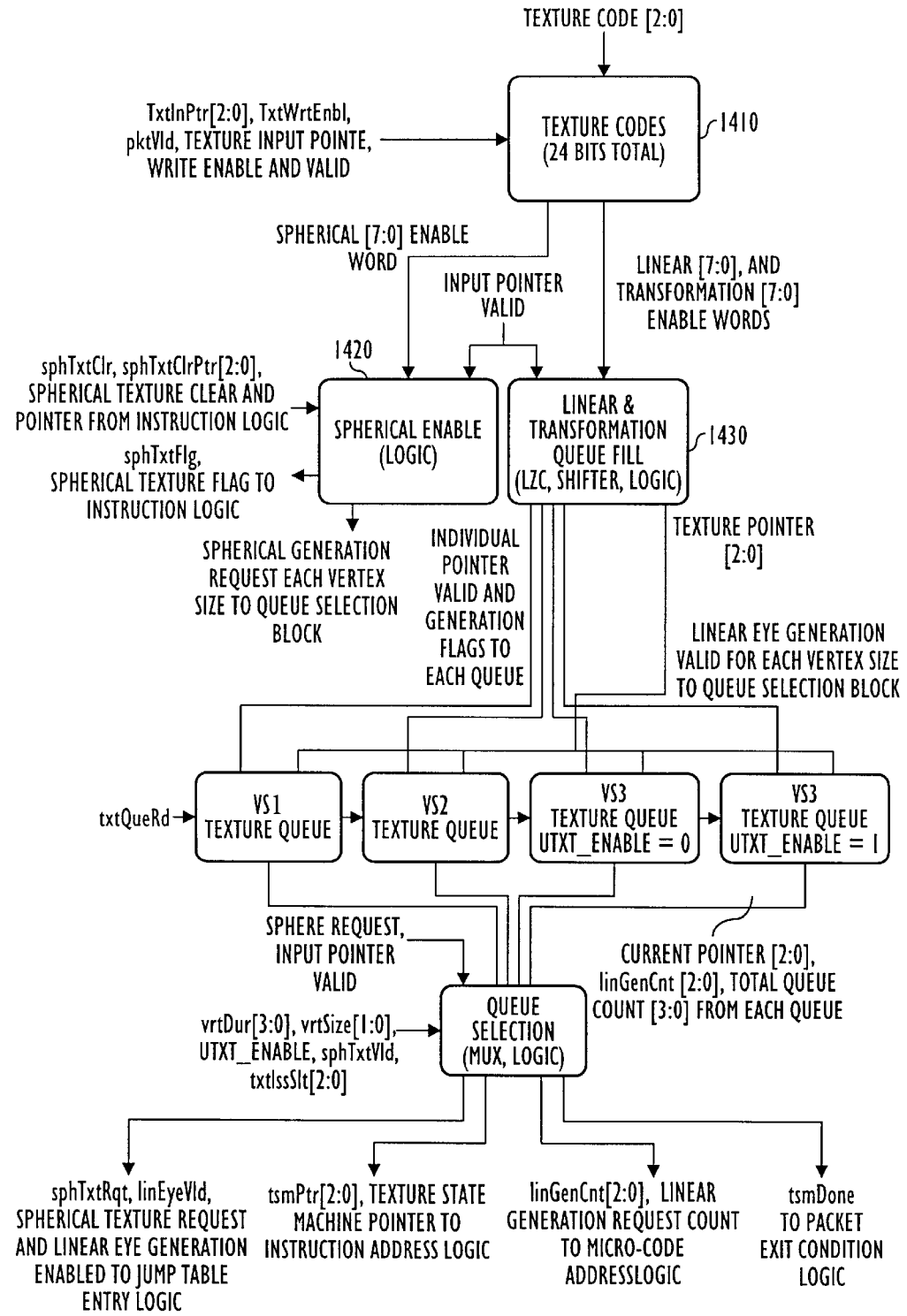
FIG. 14 is a block diagram of the texture state machine.

FIG. 14 is a block diagram of the texture state machine. Protocols

The geometry block 842 performs all spatial transformations and projections, Vertex lighting, texture-coordinates generation and transformation, surface-tangents computations (generation, transformation and cross products), line stipple-pattern wrapping, primitive formation, polygon clipping, and Z offset. Further, the geometry block 842 stores all of the transformation matrices and the Vertex lighting coefficients. The block 842 contains several units: transform 210, lighting 220, and clipping 230.

For a ten million triangles-per-second rate, the geometry block 842 processes vertices at a rate of about 1/20 cycles, assuming that about 90% of the time vertex data is available for processing and that vertices are in the form of triangle strips. Since the pipeline #_840 design is for average-size triangles at this rate, the performance of remainder of the pipeline 840 fluctuates according to the geometry size. The geometry block 842 compensates for this by selecting a maximum rate slightly better than this average rate. There is virtually no latency limitation.

Thus, the geometry block 842 is a series of 20-cycle pipeline stages, with a double or triple buffer between each of the stages. An upstream pipeline stage writes one side of a buffer while the downstream stage reads from the other side data previously written to that side of the buffer.

In addition to vertex data, the geometry block 842 also receives state information. The geometry block 842 could consume this state information or pass it down to blocks later in the graphics pipeline 840. Since a state change does not affect data ahead of it in the pipeline 840, the geometry block 842 handles state as though it were vertex data: It passes it through in order.

The geometry block 842 also controls the data bus connecting itself and the mode-extraction block 843. Using 32-bits wide bus yields slightly better bandwidth than required for the 10 million triangles/second goal (at 333 MHz).

The Transformation Unit

The transformation unit 210 transforms object coordinates ($X_o, Y_o, Z_o, W_o$) to eye coordinates ($X_e, Y_e, Z_e, W_e$), or directly transforms them to clip coordinates (Xc, Yc, Zc, Wc). The transformation unit also calculates window coordinates Xw, Yw, Zw, and further implements stipple repeat-pattern calculations. The transformation unit 210 transforms user-provided texture coordinates (So, To, Ro, Qo) into eye coordinates (Se, Te, Re, Qe) or, if requested by the application it generates them from the spatial data. Effectively, this transforms spatial data in eye (EYE_LINEAR) or object space (OBJECT_LINEAR) into texture coordinates in object space. The transformation unit 210 provides a third type of texture-generation mechanism: namely, generating texture coordinates that preferably access a texture representing the surface of a sphere, e.g., for use in reflection mapping using OpenGL or other methodolgies.

The transformation unit 210 transforms normal-vector object coordinates (Nxo, Nyo, Nzo) in eye coordinates (Nxe, Nye, Nze). The same transformation can apply to bi-normal object coordinates (Bxo, Byo, Bzo) and surface-tangent object coordinates (Gxo, Gyo, Gzo) to generate eye-coordinate representation of these vectors (Bxe, Bye, Bze, and Gxe, Gye, Gze). Similar to the texture coordinates, bi-normal and surface-tangent vectors can be generated from spatial data. Additionally, various options of vector cross-product calculations are possible, depending on the bump-mapping algorithm currently active. Regardless of the method of attaining the normal, bi-normal and surface-tangent vectors, the transformation unit 210 converts the eye coordinates into magnitude and direction form for use in the lighting sub-unit and in the phong unit.

The trivial reject/accept test for both the user defined and the view volume clip planes are performed on each vertex. The results of the test are passed down to the clipping unit 230. The area calculation determining the visibility of the front or the back face of a primitive is also calculated here, and the result is passed down to the clipping unit 230.

The Vertex Lighting Unit

The Vertex lighting unit 220 implements the per-vertex computations for the twenty-four Vertex lights, combining all enabled lights before they leave this unit. The total specular component may not be combined with the remaining light components if the SINGLE_COLOR mode is not set. This allows interpolation of the specular component independent of the rest of the light information later in the pipeline.

The lighting unit 220 also implements the "color material" state and substitutions (Vertex only).

The Polygon-Clipping/Primitive-Formation Unit

The clipping unit 230 has a duplicate copy of the user-defined clip plane, while the view-volume plane (Wc), which is loaded by the aux rng, passes down with vertex data. This unit 230 tests every polygon to determine if the shape is fully inside or fully outside the view volume. A primitive that is neither fully inside or fully outside it clips off until the remaining shape is fully inside the volume. Because interpolation of the data between vertices that are part of a filled primitive occurs later in the pipeline, the original vertex information is retained with the new vertex spatial information. The clipping unit 230 interpolates line primitives at a significant performance cost. This preferred implementation advantageously avoids the necessity to create new spatial data and new texCoords narmals, colors, etc. at verticles that are created in the clipping process.

The OpenGL specification defines ten distinct types of geometric primitives: points, lines, line strips, line loops, triangles, triangle strips, triangle fans, quadrilaterals, quadrilateral strip, and polygons. However, the design of the pipeline 840 is based on processing triangles, so the clipping unit 230 breaks polygons with more than 3 vertices into smaller components. Additionally, the clipping unit 230 inplements operations that change the data associated with a shading, for example, vertix flat-type shading.

The geometry block 842 stores data in 32-bit floating-point format. However, the data bus to the mode-extraction block 843 is only 24 bits. Thus, the clipping unit 230 converts, clamps and packs data before its leaving the unit. The bus to the mode-extraction block 843 leaves directly from this unit 230.

Input and Output

The geometry block 842 interfaces with the command-fetch-and-decode block 841, an auxiliary ring and the mode-extraction block 843. The command-fetch-and-decode block 841 is the normal source of input packets to the geometry block 842, and MEX is the normal sink for output packets from The geometry block 842. The auxiliary ring provides special access to the hardware not normally associated with processing geometry, such as micro-code or random access to The geometry block 842 data-path registers.

Normal input to the geometry block 842 is from the command-fetch-and-decode block 841. Special inputs from the auxiliary ring download micro-code instructions and non-pipelined graphics functions like context switching.

The interface to the command-fetch-and-decode block 841 consists of a data bus, command bus, and several control signals. Together these buses and signals move packets from the command-fetch-and-decode block 841 to the geometry block 842.

The command-fetch-and-decode block 841 queues up packet data for the geometry block 842, and when a complete packet and command word exist, it signals by raising the Data_Ready flag. Processed vertices can require multiple packet transfers to transfer an entire vertex, as described further below.

As the geometry block 842 reads a word off of the data bus, raises the Acknowledge signal for one cycle. (As only complete packets of 24 words are transferred, the acknowledge signal is high for 12 clocks.) Further, the geometry block 842 attempts to transfer a packet only at pipeline-cycle boundaries, and the minimum pipeline cycle length is 16 machine cycles. The packets consist of 12 data-bus words, W0 through W11, and one command-bus word.

The global command word's second and third most significant bits (MSBs) determine how the geometry block 842 processes the packet. The bits are the Passthrough and the Vertex flags. If set (TRUE), the Passthrough flag indicates the packet passes through to the mode-extraction block 843. If clear (FALSE), the flag indicates that the geometry block 842 processes/consumes the packet.

If set, the Vertex flag indicates the packet is a vertex packet. If clear, the flag indicates the packet is a mode packet.

The format of a consumed mode packet is described below. Bit 31 is reserved. Bits 30 and 29 are the Passthrough and Vertex flags Bits 28–25 form an operation code, while bits 24–0 are Immediate data.

The operation code has any of ten values including: General_Mode, Material, View_Port_Parameters, Bump_State, Light_Color, Light_State, Matrix_Packet and Reserved. The packet and immediate data corresponding to each of these operation codes is described in turn below.

Auxiliary-ring I/O uses a subset of the consumed mode packet operation codes, including Ring_Read_Request, Ring_Write_Request and Microcode_Write. For these packets, the IMMEDIATE data have fields for logical pipeline stage (4-bits), physical memory (4-bits), and address (10-bits) that account for the worst case in each pipeline stage.

A general mode packet delivers the remainder of the mode bits required by the geometry block 842.

A material packet delivers material color and state parameters.

A view-port packet contains view port parameters.

A bump packet delivers all parameters that are associated with surface tangents and bump mapping.

A light-color packet contains specific light color parameters.

A light-state packet contains light model parameters.

A matrix packet delivers matrices for matrix memory. The packet is used for all texture parameters, user clip planes and all spatial matrices.

The format of a processed vertex packet is described below. Bit 31 is reserved. Bits 30 and 29 are the Passthrough and Vertex flags. Bits 28–27 form a vertex size, bits 6–3 form a primitive type, bits 2–1 form a vertex sequence, and bit 0 is an edge flag. Each of these fields is described in turn below.

(Bits 26–7 of a processed-vertex packet are unused.)

The vertex size indicates how many packet exchanges complete the entire vertex transfer: 1, 2 or 3. With vertex size set to 1, the one packet is a full-performance vertex packet that transfers spatial, normal, texture[0] and colors. With vertex size set to 2, each of the two packets is a half-performance vertex packet. The first packet is identical to the full-performance vertex packet. The second packet transfers texture[1], bi-normal and tangent. With vertex size set to 3, each of the three packets is a third-performance vertex packet. The first two packets are identical to the half-performance packets. The third packet transfers texture [2–7 ].[1]

[1] Actually, there is only one packet ever transferred. Multiple exchanges and multiple transfers can occur per packet, but there is only one packet transferred.

The Primitive Type is a 4-bit field specifying the primitive type formed by the vertex: points, lines, line strips, line loops, triangles, triangle strips, triangel fans, quads, quad strips and polygons.

The Vertex Sequence is a 2-bit field specifying the sequence of the vertex in a primitive: First, Middle, Last or First_and_Last. First specifies the first vertex in a primitive, Middle specifies a vertex in the middle, and Last specifies the last vertex in a primitive. First_and_Last specifies a single point that is both the first and last vertex in a primitive.

The Edge flag specifies that the polygon edge is a boundary edge if the polygon render mode is FILL. If the polygon render mode is LINE, specifies if the edge is visible. Finally, if the polygon render mode is POINT, it specifies that the point is visible.

0—Boundary or visible
1—Non-boundary or invisible

A Size-1 (full-performance) vertex packet delivers a Size-1 vertex in one transfer.

A Size-2 (half-performance) vertex packet delivers a Size-two vertex in two consecutive transfers. The geometry block 842 reads the command bus only once during this packet. Once the transformation unit 210 starts to process a vertex, it does not pause that processing, so the two data transfers occur on consecutive pipeline cycles. (The command-fetch-and-decode block 841 does not assert Data Ready until it can guarantee this.)

The position of the parameters in the packet is fixed with the possible exception of texture coordinates. If the tangent generation is enabled (TANG_GEN=1), then the texture specified for use in tangent generation (BUMP_TXT[2:0]) swaps position in the packet with texture zero. BUMP_TXT can only be set to zero or one for size 2 vertices.

A Size-3 (third-performance) vertex packet delivers a Size-3 vertex in three consecutive transfers. As with the Size-2 vertex packet, the geometry block 842 reads the command bus only once during this packet. Once the transformation unit 210 starts to process a vertex, it does not pause that processing, so the three data transfers occur on consecutive pipeline cycles. (The command-fetch-and-decode block 841 does not assert Data Ready until it can guarantee this.)

The position of the parameters in the packet is fixed with the possible exception of texture coordinates. If the tangent generation is enabled (TANG_GEN=1), then the texture specified for use in tangent generation (BUMP_TXT[2:0]) swaps position in the packet with texture zero. BUMP_TXT can only be set to zero or seven for size three vertices.

Propagated Mode packets move up to 16 words of data unaltered through the geometry block 842 to the mode-extraction block output bus. A command header is placed on the mode-extraction block bus followed by Length words of data, for a total of LENGTH+1 words.

The format of a Propagated Mode packet is described below. Bit 31 is reserved. Bits 30 and 29 are the Passthrough and Vertex flags. Bits 20–16 form a Length field. (Bits 28–21 and 15–0 are unused.)

Length is a five-bit field specifying the number of (32-bit) words that are in the data portion of the packet. In one embodiment, values range from 0 to 16.

The format of a Propagated Vertex packet is described below. Bit 31 is reserved. Buts 30 and 29 are the Passthrough and Vertex flags. Bits 20–16 form a Length field. (Bits 28–21 and 15–0 are unused.)

A Propagated Vertex packet performs like a Propagated Mode packet except that the geometry block 842 discards the command word as it places the data on the mode-extraction block output bus, for a total of Length words.

The geometry pipeline 840 uses the auxiliary ring as an interface for special packets for controlling the geometry block 842 during startup, initialization and context switching. The packets use consumed mode command words (Passthrough=FALSE, Vertex=FALSE) and thus share the same command word description as the consumed mode command words from the command-fetch-and-decode block 841. The ring controller in the geometry block 842 has access to the command-fetch-and-decode block 841 data and command bus before it enters the first physical pipeline stage in the transformation sub-unit, so the majority of the geometry block 842 has no knowledge of the source of the packet. The command-fetch-and-decode block 841 gets priority, so (for good or bad) it can lock the ring off the bus.

Normal output from the geometry block 842 is to the mode-extraction block 843. Special outputs to the auxiliary ring help effect non-pipelined graphics functions such as context switching.

The interface to the mode-extraction block 843 includes a data bus and two control signals, for example Data Valid. A Data Valid pulse accompanies each valid word of data. The interface hardware controls a queue on the mode-extraction block side. Geometry block 842 is signalled when there are thirty-two entries left to ensure that the current pipeline cycle can finish before the queue is full. Several additional entries compensate for the signal travel time.

The mode-extraction block 843 recognizes the first entry in the queue as a header and decodes it to determine the length of the packet. The block 843 uses this length count to recognize the next header word.

There are four types of packets output from the geometry block 842: color vertex, spatial vertex, propagated mode, and propagated vertex. Each of these packets is described in turn below.

The color vertex and spatial vertex packets are local packets that are the result of processed vertex input packets. The propagated output packets correspond one for one to the propagated input packets.

A Color Vertex packet contains the properties associated with a vertex's position. Every vertex not removed by back face culling or clipped off by volume clip planes (trivial reject or multiply planes exclude complete polygon) produces a single vertex color packet. The size of the packet depends on the size of the input vertex packet and the state at the time the packet is received.

A Spatial Vertex packet contains the spatial coordinates and relationships of a single vertex. Every input vertex packet not removed by back face culling or clipped off by volume clip planes (trivial reject or multiply planes exclude complete polygon) produces a spatial vertex packet corresponding to the exact input vertex coordinates. Additional spatial vertices are formed when a clip plane intersects a polygon or line, and the polygon or line is not completely rejected.

An output Propagated Mode packet is identical to its corresponding input packet.

An output Propagated Vertex packet contains all of the data of its corresponding input packet, but its command word was been stripped off. The geometry block 842 does not output the input command word. Nonetheless, the Length field from the command word sets the number of valid words put on the output bus. Thus, LENGTH=data words for Propagated Vertex packets.

The Geometry Block

The geometry block 842 functions as a complete block from the perspective of the rest of the blocks in the pipeline 840. Internally, however, the block 842 functions as a series of independent units.

The transformation unit 210 regulates the inflow of packets to the geometry block 842. In order to achieve the high-latency requirement of the spherical-texture and surface-tangent computations, the block 842 bypasses operands from the output back to its input across page-swap boundaries. Thus, once a packet (typically, a vertex) starts across the transformation unit 120, it does not pause midway across the unit. A packet advances into the logical pipeline stage A 212 when space exists in the synchronization queues 231 for the entire packet.

The lighting unit 220 also bypasses from the functional unit output to input across page-swap boundaries. To facilitate this, are placed at its input and output buffer the lighting unit 220. The queues work together to ensure that the lighting unit 220 is always ready to process data when the transformation unit 210 has data ready.

Each record entry in the input queue has a corresponding record entry in the output queue. Thus, the lighting unit 220 has room to process data whenever the transformation unit 210 finds room in the synchronization queue. Packets in the synchronization queues become valid only after the lighting unit 220 writes colors into its output queue. When the output queue is written, the command synchronization queue is also written.

The clipping unit 230 waits until there is a valid packet in the synchronization queues. When a packet is valid, the clipping unit 230 moves the packet into the primitive-formation queues 231. The output of the geometry block 842 is a simple double buffer.

The internal units 210, 220, 230 are physical pipeline stages. Each physical pipeline stage has its own independent control mechanism that is synchronized to the rest of the block 842 only on pipeline-stage intervals.

The clipping unit 230 has some rather unique constraints that cause it to stop and start much more erratically than the remainder of the block 842.

At system reset, the pipeline is empty. All of the Full signals are cleared, and the programmable pipeline-cycle counter in the unit controller begins to count down. When the counter decrements past zero, the Advance_Pipeline signal is generated and distributed to all of the pipeline-stage controllers. The counter is reset to the programmed value.

If there is a valid request to the geometry block 842 pending, a packet enters the top of the pipeline from either the command-fetch-and-decode block 841 or the auxiliary ring. (The auxiliary-ring command unit has priority, enabling it to lock out command-fetch-and-decode block auxiliary-ring command requests.)

During the next pipeline cycle, the unit controller analyzes the packet request and prepares the packet for processing by the pipeline stages. This can be a multi-pipeline-cycle process for data coming from the auxiliary ring. (The command-fetch-and-decode block 841 does some of the preparation for the geometry block 842, so this is not the case for requests from the block 841 ). Further, some packets from the command-fetch-and-decode block 841 are multi-pipeline-cycle packets. The command-fetch-and-decode block 841 does not send a request to the geometry block 841 to process these packets until the block 841 has the complete packet ready to send.

When the pipeline-cycle counter again rolls over and the Advance_Pipeline signal is distributed, the unit controller analyzes its Pipeline_Full input. If the signal is clear, the controller resets the Hold input of the pipeline-stage-A command register to advance the packet to the next stage. Stage A 212 detects the new packet and begins processing.

Stage A 212 could require more than one pipeline cycle to process the packet, depending on the type of packet it is and the state that is set in the stage. If more than one pipeline cycle is required, the stage raises the Pipeline_Full signal. If Pipeline_Full is raised, the unit controller is not allowed to advance the next packet down the pipe. When the stage detects that the packet will complete in the current stage, the Pipeline_Full signal is cleared, and just as the unit controller advanced the command register of stage A, stage A advances the command register of stage B.

As the pipeline fills, the decision-making process for each stage can get more complicated. Since each stage has a different set of operations to perform on any given vertex, some sets of operations can take longer than others. This is particularly true as more complex states are set in the individual pipeline stages. Further, some of the packets in the pipeline can be mode changes rather than vertices. This can alter the way the previous vertex and the next vertex are handled even in an individual pipeline stage.

A unit controller regulates the input of data to the geometry pipeline 842. Commands come from two sources: the auxiliary ring and the command-fetch-and-decode block 841. Auxiliary-ring memory requests are transferred by exception and do not happen during normal operation. The controller decodes the commands and generates a command word. The command word contains information about the packet that determines what the starting instruction is in the next pipeline stage. Further, the unit controller also manages the interface between the command-fetch-and-decode and geometry blocks 841, 842.

The auxiliary-ring commands are either instruction-memory packets (write) or data-memory (read) packets to the various pipeline stages. The read feature reads stipple patterns during context switching, but the read mechanism is generic enough that most memory locations can be read.

The command-fetch-and-decode block commands are of two types: propagated mode (propagated or consumed), or vertex.

The pipeline-stage controllers for each stage are all variations on the same basic design. The controllers are as versatile as possible in order to compensate for hardware bugs and changing algorithms. In one embodiment, they are implemented as programmable micro-code. In fact, all state in the controllers is programmable in some way.

The pipeline-stage control begins with the previous stage (i−1) placing a new command in the command register. The instruction control state machine checks for this event when the Advance_Pipeline signal is pulsed.

Programmable microcode instruction memory drives the geometry block 842. Each physical stage has a dedicated instruction memory. Since each physical stage has slightly different data-path elements, the operation codes for each physical stage are slightly different.

The Pipe Stage A

The logical pipeline stage A 212 primarily transforms vertices with 4-by-4 matrices. Accordingly, its instruction set is comparatively small. In order to add more utility to the unit, a condition code with each matrix-multiplication operation specifies how the result of the operation is used.

The instruction memory 1230 is divided into pages of instructions. Each page contains a "pipeline cycle" worth of operations. The command register 12A0 drives the page selection. The decode logic uses the command and the current mode to select the appropriate jump table address for the current state.

The jump table contains an instruction memory address and page mode. (Page mode is mode that is valid only for the current pipeline cycle.) The instruction-memory address points to the first valid instruction for the current page. All instructions issue in one cycle. Thus, this initial address is incremented continuously for the duration of the pipeline cycle.

The Advance_Pipeline signal 211H tells the GCW controller 1210 to evaluate the state of the current command to determine if it has completed. If it is complete, the controller 1210 removes the hold from the command register 12A0 and a new command enters the pipeline stage.

The command register 12A0 is a hold register for storing the geometry command word. The command word consists of the unaltered command bus data and a valid bit (V) appended as the MSB.

The decoder 1220 is combinatorial logic block that converts the operation-code field of the command word and the current mode into an address for referencing the jump-table memory 1230. The decoder 1220 also generates texture pointers and matrix pointers for the texture state machine 1260, as well as new mode enable flags for the write-enable memory 1280.

The remainder of the state (not in the texture state machine) is also in the instruction controller 2126. In particular, TANG_GEN and TANG_TRNS are stored here. These registers are cleared at reset and set by a Bump_State packet.

The hardware jump table is used during reset and startup before the programmable memories have valid data.

The write-enable memory 1280 stores the write-enable bits associated with each of the matrices stored in the matrix memory 2125. An enable bit exists for each of the data paths for the four functional unit 2122. The operand A address bits [6:2] select the read address to this memory 1280.

Matrix multiply and move instructions can access the write-enable memory 1280. The write enables enable word writes to the vertex buffers BC 2123 and to enable sign-bit writes to the geometry command word.

The memory is filled by Matrix packets in the geometry command word. The packet header (command) contains both the write address and the four enable bits.

The instruction field merge logic 1290 is a primarily combinatorial logic that selects which signals control which data-path components. The hardware instruction memory 1270 selects the hardwired or software instructions. Some of the fields that make up the software instruction word are multiplexed.

The texture state machine selects mode of the data-path control fields.

The hardware instruction memory 1250 controls the data path at the startup before the micro-code memory has been initialized.

The geometry command word controller 1210 implements the sequencing of stage A 212. The Advance_Pipeline signal 211H from the global packet controller 211 triggers the evaluation of the exit code. (The exit codes are programmable in the jump-table memory 1240.)

The possible exit codes are TRUE, FALSE, and TSM_CONDITIONAL. TSM_CONDITIONAL allows the TSM_Done signal to determine if the current instruction page completes the current packet. If the condition is TRUE, then the next Advance_Pipeline strobe releases the hold on the command register, and a new command enters the pipe.

A duration counter track the time a vertex is in the stage 212. The writing of a new command to the command register 12A0 clears the counter.

The texture state machine 1260 determines the requirements and tracks the state of each of the eight textures and the two user-defined clip-plane sets. The state machine 1260 prioritizes requirements based on the size of the vertex and the current duration. The vertex size limits the maximum texture number for the current vertex. The current duration limits the maximum texture number for the current pipeline cycle.

The state machine 1260 prioritizes in this order: generation, clipping sets, transformations. If textures are not generated, they are moved to the vertex buffer BC. The move operations use the complement of the four-bit generation write-enable mask associated with each texture. This ensures that all enabled textures propagate to the vertex buffer BC.

When micro-coded texture instructions are issued, the state machine 1260 provides the instruction word. When the addresses are used, the state machine 1260 marks that operation as complete and moves on to the next requirement.

The Pipeline Stages Preferably interleaved pipeline stages are used in the presetn invention, e.g., combined single stage BC, although other configurations could instead be used.

The Scratch-Pad Memory

Single logical pipelinestage BC is used to temporarily store data associated with the current vertex in the scratch-pad memory 2132. Logical stage Bc can also store in the memory 2132 current mode information used in the data-path calculations—view-port transformation parameters and bump-scale parameters, for example. Finally, the logical stages B and C store in the memory 2132 the values previous two vertices of the eye, texture, and window coordinates.

Current vertex data preferably are divided into logical stage BC, which can act as though it were a double-buffer section. A new vertex packet switches the buffer pointer, so data computed in stage B can be used in stage C, such that BC may be treated as a single stage.

The previous vertex data is broken into logical M1 and M2 double-buffer sections. The buffer pointer also switches as a new vertex packet propagates down the pipeline. (This is distinct from the "first" and 'second" vertex notation dependant on the current geometry and vertex order.)

The Vertex Buffers BC

The vertex buffers BC 2123 stage the vertex data through the math functional units 2133. The vertex buffers BC 2123 serve as a triple buffer between stages A, and BC, where stage A accesses the write side (W) of the buffer, stage B accesses one of the read buffers (R0), and stage C accesses the second read buffer (R1). As a new vertex (SN=1) propagates down the pipeline, it receives additional buffer pointers in the order W, R0, R1. That given vertex retains possession of each of the pointers until either a second vertex or mode packet follows.

The Math Functional Units

The math functional units 2123 in this stage are mathFunc_F32. There are two, and each can execute independent instructions each cycle.

Where the math-functional-unit operation codes are as follows:

| MNEMONIC | FUNCTION |
|---|---|
| MUL | R = A * B |
| NMUL | R = -(A * B) |
| ACC | R = A * B + acc |
| NACC | R = -( A * B) + acc |
| RCPMUL | R = A * B + rom |
| RSQTMUL | R = A * B + rom |
| RCP | A = D, B = U |
| RSQT | A = D, B = U | a dot-product sequence is simply MUL, ACC, ACC. The reciprocal sequence is RCP, RCPMUL. Likewise, the reciprocal-square-root sequence is RSQT, RSQTMUL.

Since neither data conversion or de-normal numbers are required, forcing the MSB of both mantissas to 1 sets the Implied bit. The output MSB of the mantissa can also be ignored. The overflow and underflow bits preferably go to an error register.

Instruction Control

Controller 1800 controls two instructions streams used by logical stage BC, which stage time-shares control of the data path. It will be appreciated that some duplication may be required, e.g., for command words registers 1810) to enable co-existence of virtual pipeline stages within a common physical stage.

The Command Register

Simple hold registers 1810 store the geometry command word. Each consists of the unaltered command bus data and control bits made by the previous stage.

Stage B and C each have a copy of the command register. Stage B adds comparison bits for determining which view-volume planes were cut by the current geometry.

The Decoder

The decoder 1830 is combinatorial logic that converts the operation-code field of the command word and the current mode into an address for referencing the jump-table memory 1840. The write-enable register 1890 stores write-enable pointers, write-enable bits and mode write-enable strobes.

All components in the decoder are time-shared.

The Hardware Jump Table

The hardware jump table 1850 is used during reset and startup before the programmable memories have valid data.

All components in the hardware jump table are time shared. There is no duplication related to the interleaved stages.

The Write-Enable Register

The write-enable register 1890 stores the write-enable bits for conditional-write instructions.

Each stage has its own unique enable register. The jump table 1850 can be programmed to pass the B register to the C register at any pipeline-cycle boundary.

The Field-Merge Logic

The instruction field merge logic 1880 is a combinatorial block that selects the signals controlling the data-path components. The hardware instruction memory 1870 selects the hardwired or the software instructions. Some of the fields that make up the software instruction word are multiplexed.

The instruction field merge logic 1880 implements the selection of data for the conditional-write instructions.

The Hardware Instruction Memory

The hardware instruction memory 1870 controls the data path at startup before the micro-code memory has been initialized.

The Clipping Unit

The clipping unit 230 is the back end of the geometry block 842. Vertex packets going into the clipping unit 232 have all of their data computed in the transformation and lighting units 210, 220. The lighting unit 220 computes vertices' color while the transformation unit 210 supplies the remaining data. The units 210, 220 write data into several synchronization queues where they are synchronized on entering the clipping unit 232.

The clipping unit 230 is divided into two functional parts: clipping and format sub-units 232, 233. The clipping sub-unit 232 collects vertices, forms primitives, clips primitives and outputs results. The format sub-unit 233 reformats the data from the clipping sub-unit 232 to the desired form and sends the packets out to the mode-extraction block 843 through an output queue 234.

The clipping sub-unit 232 breaks the input geometry into either point, line or triangle-type primitives, clips the resulting primitives against both user-defined clip planes and the view volume planes and sends the clipped primitives to the format sub-unit 233.

Vertex packets pass through clipping sub-unit in three pipeline stages: K, L and M. In stage K, the primitive formation queues 2321, 2322, 2324 store vertex data. Concurrently, primitive formation occurs. If a primitive is formed, the stage K passes on the new primitive to stage L for clipping.

Stage L checks the new primitive for the trivially-accept-or-reject condition. When clipping is necessary, executes microcode to perform the clipping algorithm, as described herein.

After the clipping algorithm completes, the control for stage L moves the clipped result out to stage M.

Stage M extracts the clipped and original primitives and sends them to the format sub-unit 233.

(The depths of header queues to stage L and M are chosen to ensure that the clipping sub-unit 232 does not insert bubbles into the pipeline due to lack of header space. The worst scenario in which a bubble insertion may occur is the processing of trivially accepted geometries.)

The data path of the clipping sub-unit 232 has a 32-bit floating-point math unit 2325 that carries out all the calculations involved in clipping a primitive.

The four memory blocks (the scratch pad GPR 2322 and the primitive, texture and color queues 2321, 2323, 2324. The primitive-queue memory block 2321 and the scratch-pad GPR 2322 support primitive clipping by storing temporary data and new vertices data. The texture- and color-queue memory blocks 2323, 2324 accumulate vertices data for forming primitive and smoothing out variation in latency.

The owner of the scratch-pad GPR 2322 is always stage L. The three stages, K, L and M share ownership of the read and write ports of the other three memory blocks 2321, 2323, 2324. "Ownership" means that the stage "owning" the port provides all the necessary address and control signals.

Specifically, stages K and L share ownership of the write port of the primitive queue 2321. Stage K uses this write port to transfer spatial data into the primitive queue 2321. Stage K has lower ownership priority compared to stage L, but because stage L and K runs independent of each other, stage L has to provide enough bandwidth for stage K to complete the data transfer in any one pipeline stage.

There are two shared ownerships between stage L and M. Stage M can own Read Port 1 (the second output, or the port on the right) of the primitive queue 2321, but it has the lower priority than stage L. Stage M uses this second port to read out the data of new vertices of the clipped primitive. While stage L minimizes its use of the second output port, there are potentially cases when stage M may not have enough bandwidth. Hardware hooks deal with this scenario.

The second shared ownership between stages L and M are on the read ports of the texture and color queues 2323, 2324. In this case, stage M has the highest priority in using a read port. If stage L needs to access data in one of these two queues 2323, 2324, it makes sure that stage M is not using the port. Otherwise, stage L waits for the next pipeline stage and repeats.

This scheme puts stage L at a disadvantage. However, stage L reads from one of the ports for interpolation only, and the interpolation performance is acceptably low.

The invention now being fully described, many changes and modifications that can be made thereto without departing from the spirit or scope of the appended claims will be apparent to one of ordinary skill in the art.

What is claimed is:

1. A geometry processing device comprising:
   (A) a packet controller comprising:
      (1) registers receiving: data; and commands encoding the type and quantity of the received data; and
      (2) an interface state machine, receiving the commands, comprising:
         (a) logic decoding the commands to determine the number of pipeline cycles needed to execute each of the commands, each of the pipeline cycles being a specific number of clock cycles; and
         (b) logic generating a signal indicating the boundary between the pipeline cycles;
   (B) one or more instruction controllers connected in a first pipeline fashion, each instruction controller comprising:
      (1) a register receiving one of the commands from the previous instruction controller in the first pipeline fashion, a first of the instruction controllers receiving one of the commands from the packet controller;
      (2) logic decoding the received one of the commands, the decoding being specific to the particular instruction controller of the one or more instruction controllers such that the same command is decoded differently by other of the instruction controllers;
      (3) a jump table generating a first address;
      (4) a program counter comprising:
         (a) logic for receiving the generated first address as a current address; and
         (b) logic for incrementing the current address;
      (5) a micro-code instruction memory receiving the current address and outputting a first plurality of control bits; and
      (6) logic receiving the signal indicating the boundary between the pipeline cycles to determine when a new one of the command is to be received; and
   (C) one or more datapath units connected in a second pipeline fashion, each datapath unit corresponding to one of the pipelined instruction controllers, each datapath unit comprising:
      (1) one or more multiported memories receiving input data from the previous datapath unit in the second pipeline fashion, a first of the datapath units receiving the input data from the packet controller; and
      (2) one or more arithmetic units receiving second control bits derived at least in part from the first control bits from the corresponding instruction controller and computing output data based on the input data.

2. The geometry processing device of claim 1, wherein the data received by the packet controller comprises vertices in three dimensions that describe lines, points, and polygons, the descriptions comprising colors, surface normals, and texture coordinates.

3. The geometry processing device of claim 2, wherein at least one of the datapath units generates a plurality of packet types, the packet types being a color vertex packet, a spatial vertex packet, a propagated mode packet, and a propagated vertex packet.

4. The geometry processing device of claim 2, wherein at least one of the datapath units generates a propagated vertex packet, the propagated vertex packet comprising data describing a vertex that was passed through all the datapath units without modification.

5. The geometry processing device of claim 2, wherein at least one of the datapath units generates a propagated mode packet, the propagated mode packet comprising mode data that was passed through all the datapath units without modification.

6. The geometry processing device of claim 1, wherein the instruction controller further comprises:
   one or more programmatically loaded memories generating third control bits from the decoded one of the commands; and
   field merge logic generating at least some of the second plurality of control bits by combining at least some of the first plurality of control bits and at least some of the generated third control bits.

7. The geometry processing device of claim 1, wherein the instruction controller further comprises:
   logic interleaving operations from different received one of the commands so as to keep the arithmetic units in the corresponding datapath unit busy.

8. The geometry processing device of claim 1, wherein the instruction controller further comprises:
   logic generating a pipeline full signal indicating the instruction controller requires an additional one of the pipeline cycles to complete the received one of the commands, thereby preventing all other of the instruction controllers from beginning a next one of the received commands.

9. A geometry processing device for a 3D graphics rendering pipeline, the pipeline receiving graphics data and generating a rendered image, the graphics data comprising vertices, the geometry processing device comprising:

arithmetic units performing transformations and lighting operations on the graphics data, generating a first output vertex comprising: transformed (x,y,z) coordinates; texture coordinates, and vertex colors; and memories for storing matrices used by the arithmetic units, the matrices received from a host processor, thereby having the geometry processing device use the matrices but not calculate values in the matrices; and logic taking some of the graphics data and passing it through the arithmetic units unchanged to generate a second output vertex of identical format to the first vertex but comprising only data fields taken directly from parts of the graphics data.

10. A processing method comprising the steps:

receiving a stream of data;

receiving a stream of commands, each of the commands indicating: (1) an amount of contiguous data from the stream of data that corresponds to the command; (2) the type of data in the amount of data; and (3) the type of processing to be performed on the amount of data; and for each of the received commands, processing the corresponding data in a sequence of processing stages, the processing stages each performing, in a programmatically fixed number of clock cycles, the steps:

receiving a next one of the commands;

decoding the received next command to determine the indicated type of processing to be done in the processing stage;

processing a next amount of data to generate output data;

taking the programmatically fixed number of clock cycles to process the corresponding data;

at the end of the programmatically fixed number of clock cycles, outputting the output data to a next processing stage in the sequence of processing stages;

at the end of the programmatically fixed number of clock cycles, outputting the received next command to the next processing stage; and conditionally asserting a signal indicating the received next command can not be completed in the programmatically fixed number of clock cycles, the signal being broadcast to all the processing stages, the signal causing all the stages to spend an additional set of the programmatically fixed number of clock cycles on the stages, corresponding received next command.

11. The processing method of claim 10, wherein the received command programmatically causes in all of the processing stages, the step of processing a next amount of data to output the next amount of data as the output data without alteration, thereby outputting from a final one of the processing stages output data that is identical to the corresponding amount of contiguous data from the stream of data.

* * * * *